(12) United States Patent
Li et al.

(10) Patent No.: US 12,735,258 B2
(45) Date of Patent: Sep. 15, 2026

(54) STEREOSCOPIC WAREHOUSE SCHEDULING SYSTEM

(71) Applicant: Beijing Geekplus Technology Co., Ltd., Beijing (CN)

(72) Inventors: Hongbo Li, Beijing (CN); Honghan Lu, Beijing (CN); Kaozhun Li, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 340 days.

(21) Appl. No.: 18/701,200

(22) PCT Filed: Aug. 8, 2022

(86) PCT No.: PCT/CN2022/110912
§ 371 (c)(1),
(2) Date: Apr. 12, 2024

(87) PCT Pub. No.: WO2023/061009
PCT Pub. Date: Apr. 20, 2023

(65) Prior Publication Data

US 2024/0409315 A1 Dec. 12, 2024

(30) Foreign Application Priority Data

Oct. 15, 2021 (CN) ......................... 202122496421.6
Oct. 26, 2021 (CN) ......................... 202111250003.7
Oct. 26, 2021 (CN) ......................... 202122588578.1

(51) Int. Cl.
*B65G 1/137* (2006.01)
*B65G 1/04* (2006.01)
(Continued)

(52) U.S. Cl.
CPC ........... *B65G 1/137* (2013.01); *B65G 1/0478* (2013.01); *B65G 1/0492* (2013.01); *B65G 1/065* (2013.01);
(Continued)

(58) Field of Classification Search
CPC .... B65G 1/137; B65G 1/0478; B65G 1/0492; B65G 1/065; B65G 1/1378;
(Continued)

(56) References Cited

U.S. PATENT DOCUMENTS 12,325,593 B2 * 6/2025 Li ........................ B65G 1/1378
2007/0065258 A1 * 3/2007 Benedict .................. B65G 1/04
414/266
(Continued)

FOREIGN PATENT DOCUMENTS

CN 107472787 A 12/2017
CN 110040412 A 7/2019
(Continued)

OTHER PUBLICATIONS

Office Action issued on Oct. 11, 2025 for counterpart Chinese Patent Application No. 202111250003.7, with translation.
Office Action issued on Apr. 26, 2025 for counterpart Chinese Patent Application No. 202111250003.7, with translation.
(Continued)

*Primary Examiner* — Thomas Randazzo
(74) *Attorney, Agent, or Firm* — LOZA & LOZA, LLP; Michael Fedrick

(57) ABSTRACT

This specification discloses a stereoscopic warehouse scheduling system. A first conveying apparatus and a second conveying apparatus are used in a stereoscopic warehouse in a combined manner, and a conveying function of a lifting apparatus in the stereoscopic warehouse is used, so that the first conveying apparatus and the second conveying apparatus can cooperate in a dense storage warehouse to convey a movable carrier; a container handling apparatus is
(Continued)

arranged to take out goods from the movable carrier or place goods in the movable carrier, and a plurality of containers may be placed in the movable carrier, so that the utilization of storage space is improved; and the container handling apparatus is used to effectively store a container in the movable carrier or take out a container from the movable carrier, so that the sorting efficiency of the goods in the stereoscopic warehouse is improved.

20 Claims, 9 Drawing Sheets

(51) Int. Cl.

| | |
|---|---|
| ***B65G 1/06*** | (2006.01) |
| ***G05B 19/418*** | (2006.01) |
| ***G06Q 10/08*** | (2024.01) |
| ***G06Q 10/087*** | (2023.01) |

(52) U.S. Cl.
CPC ..... *B65G 1/1378* (2013.01); *G05B 19/41895* (2013.01); *G06Q 10/08* (2013.01); *G06Q 10/087* (2013.01); *Y02P 90/02* (2015.11)

(58) Field of Classification Search
CPC ............. G05B 19/41895; G06Q 10/08; G06Q 10/087; Y02P 90/02
See application file for complete search history.

(56) References Cited

U.S. PATENT DOCUMENTS

| | | | | |
|---|---|---|---|---|
| 2014/0133943 | A1* | 5/2014 | Razumov ............ | B65G 1/0492 414/281 |
| 2017/0203920 | A1* | 7/2017 | Otto .................... | B65G 1/0492 |

FOREIGN PATENT DOCUMENTS

| | | | | |
|---|---|---|---|---|
| CN | 110280488 | A | 9/2019 | |
| CN | 110949923 | A | 4/2020 | |
| CN | 111846723 | A | 10/2020 | |
| CN | 212557863 | U | 2/2021 | |
| CN | 112474380 | A | 3/2021 | |
| CN | 112499075 | A | 3/2021 | |
| CN | 113184430 | A | 7/2021 | |
| CN | 217101530 | U | 8/2022 | |
| DE | 102009017241 | B4 * | 12/2016 | ........... B65G 1/0492 |
| EP | 3653541 | A1 | 1/2019 | |
| WO | WO-2005077789 | A1 * | 8/2005 | ........... B65G 1/0492 |
| WO | WO-2021173761 | A2 * | 9/2021 | ................ B66F 9/18 |

OTHER PUBLICATIONS

Search Report issued on Apr. 26, 2025 for counterpart Chinese Patent Application No. 202111250003.7, with translation.
International Search Report for corresponding International Patent Application No. PCT/CN2022/110912, dated Oct. 24, 2022.
Extended European Search Report issued on Feb. 12, 2025 for counterpart European Patent Application No. 22879956.5, 15 pages.

* cited by examiner

STEREOSCOPIC WAREHOUSE SCHEDULING SYSTEM

CROSS-REFERENCE TO RELATED APPLICATIONS

This application is the U.S. national stage of International Patent Application No. PCT/CN2022/110912, filed on Aug. 8, 2022, which claims priorities to Chinese Patent Application No. 202122496421.6, entitled "STEREOSCOPIC WAREHOUSE SCHEDULING SYSTEM" and filed with the China National Intellectual Property Administration on Oct. 15, 2021, Chinese Patent Application No. 202122588578.1, entitled "STEREOSCOPIC WAREHOUSE SCHEDULING SYSTEM" and filed with the China National Intellectual Property Administration on Oct. 26, 2021, and Chinese Patent Application No. 202111250003.7, entitled "STEREOSCOPIC WAREHOUSE SCHEDULING SYSTEM AND METHOD" and filed with the China National Intellectual Property Administration on Oct. 26, 2021. The foregoing applications are incorporated herein by reference in their entities.

TECHNICAL FIELD

This application relates to the technical field of warehousing and logistics, and in particular, to a stereoscopic warehouse scheduling system.

BACKGROUND

At present, with the rapid development of the logistics industry, to improve the operation efficiency of a warehouse, automatic conveying apparatuses such as automated guided vehicles (AGV) or autonomous mobile robots (AMR) are usually used to realize automatic transportation of goods. In addition, since an area occupied by the warehouse is usually limited, and costs of land acquisition and use are relatively high, to improve the space utilization as much as possible and reduce operating costs, existing warehouses also store goods in a dense storage manner.

In the related art, to simultaneously resolve two problems of improving the efficiency of automatic transportation and reducing the costs of dense storage, a four-way shuttle vehicle (hereinafter referred to as a four-way vehicle) and a dedicated stereoscopic warehouse for the operation of the four-way vehicle are designed for a dense storage warehouse, as shown in FIG. 1*a* and FIG. 1*b*. FIG. 1*a* is a cross-sectional view of the stereoscopic warehouse, it can be seen that each floor of the stereoscopic warehouse includes several adjacent storage positions for storing goods, which are interspersed with several aisles for the four-way vehicle to convey goods, and each floor of the stereoscopic warehouse includes rails for the four-way vehicle to travel, where a bracket for holding a carrier is provided on each storage position, and the storage positions share the support of columns. FIG. 1*b* is a top view of the stereoscopic warehouse, it can be seen that the goods are densely stacked, so that a lot of space may be saved, and a smaller four-way vehicle can flexibly travel between the storage positions, to convey the goods to the storage positions or transport the goods to a connection point of the warehouse for delivery.

However, the four-way vehicle is a high-cost conveying apparatus, and needs to run on a rail, so that in a warehouse that uses the four-way vehicle to store and take out goods, it is difficult to change a warehouse layout flexibly due to arrangement of the rail, and the warehouse construction and use costs are high. In addition, existing four-way vehicles usually carry pallets and other bulk cargo containers, which makes it difficult to achieve dense storage of non-bulk cargoes.

SUMMARY

Embodiments of this specification provide a stereoscopic warehouse scheduling system, to partially resolve the problems that the warehouse operation costs are relatively high, a warehouse layout cannot be flexibly changed, and dense storage of non-bulk cargoes can be hardly realized existing in the related art and caused by a dense storage warehouse using four-way shuttle vehicles in which rails need to be provided on a bottom floor and a conveying task can be only executed by the four-way shuttle vehicles.

The following technical solutions are adopted in the embodiments of this specification:

This specification provides a stereoscopic warehouse scheduling system, including: one or more control servers, one or more first conveying apparatuses, one or more second conveying apparatuses, at least one stereoscopic warehouse, at least one lifting apparatus, and one or more container handling apparatuses, the stereoscopic warehouse being provided with at least two floors, the floors of the stereoscopic warehouse being in communication with each other through the at least one lifting apparatus, and the control server communicating with the first conveying apparatus and the second conveying apparatus respectively, where at least some of bottom floor storage positions on a bottom floor of the stereoscopic warehouse are provided with movable carriers, and the movable carrier is configured to carry one or more containers;

each floor in other high floors other than the bottom floor of the stereoscopic warehouse is provided with at least one high floor connection point, the high floors are respectively provided with rails for operation of the first conveying apparatus, and at least some of high floor storage positions on the high floors are provided with movable carriers;

the control server is configured to determine, according to a conveying task, a first conveying apparatus, a second conveying apparatus and a lifting apparatus for executing the conveying task, send a conveying instruction for executing the conveying task to the first conveying apparatus, the second conveying apparatus, and the lifting apparatus respectively, determine a container handling apparatus for handling a container, and send an operation instruction for executing a goods take-out task or a goods storage task corresponding to the conveying task to the container handling apparatus;

the first conveying apparatus is configured to take out or place, according to the conveying instruction sent by the control server, a movable carrier indicated by the conveying instruction from or in a high floor storage position, and convey the movable carrier indicated by the conveying instruction between the high floor storage position and a high floor connection point;

the second conveying apparatus is configured to take out or place, according to the conveying instruction sent by the control server, the movable carrier indicated by the conveying instruction from or in a bottom floor storage position, and convey the movable carrier indicated by the conveying instruction between the lifting apparatus and the bottom floor storage position, between the lifting apparatus and the container handling apparatus, or between the bottom floor storage position and the container handling apparatus;

the lifting apparatus is configured to ascend or descend to a specified floor according to the conveying instruction sent by the control server, and at least convey one or a combination selected from the movable carrier indicated by the conveying instruction, the first conveying apparatus, and the second conveying apparatus between the floors; and the container handling apparatus is configured to take out, according to the operation instruction sent by the control server, a container from the movable carrier conveyed by the second conveying apparatus, or place a container in the movable carrier conveyed by the second conveying apparatus.

Optionally, the container handling apparatus includes a first sensor, the first sensor is configured to determine, when a container is to be taken out from the movable carrier, whether a corresponding container position in the movable carrier has the container, or determine, when a container is to be placed in the movable carrier, whether a corresponding container position in the movable carrier is empty.

Optionally, the container handling apparatus includes a second sensor, and the second sensor is configured to determine a pose deviation between the container handling apparatus and the corresponding container position in the movable carrier.

Optionally, the container handling apparatus is further configured to adjust, according to the pose deviation between the container handling apparatus and the corresponding container position that is determined by the second sensor, a pose of the container handling apparatus, to eliminate the pose deviation.

Optionally, the first sensor and the second sensor are the same sensor.

Optionally, the first sensor and the second sensor are image sensors.

Optionally, the control server is further configured to schedule at least one selected from the first conveying apparatus, the second conveying apparatus, and the lifting apparatus to return the movable carrier to an original storage position or another storage position of the stereoscopic warehouse.

Optionally, the control server is further configured to determine, according to at least one selected from a goods handling frequency and a goods access quantity of goods stored on the movable carrier, an activity level of the movable carrier, and determine, according to a rank of the activity level of the movable carrier, a storage position for the movable carrier when the movable carrier returns to the stereoscopic warehouse.

Optionally, the control server is further configured to determine, according to ranks of distances between the container handling apparatus and idle storage positions, a storage position for the movable carrier when the movable carrier returns to the stereoscopic warehouse.

Optionally, the control server is further configured to schedule, in response to a tallying task, at least one selected from the first conveying apparatus, the second conveying apparatus, and the lifting apparatus to adjust the movable carrier from an original storage position in the stereoscopic warehouse to another storage position in the stereoscopic warehouse or keep the movable carrier remaining at the original storage position.

Optionally, the control server and the control server is further configured to determine, according to at least one selected from a goods handling frequency and a goods access quantity of goods stored on the movable carrier, an activity level of the movable carrier, and determine, according to a rank of the activity level of the movable carrier, a storage position for the movable carrier after position adjustment during tallying.

Optionally, the container handling apparatus is located in a bottom floor workstation, the workstation further includes a transmission line and a picking station, an inlet and an outlet of the transmission line are respectively provided with the container handling apparatus, and the picking station is located in a transmission path of the transmission line;

the container handling apparatus located at the inlet of the transmission line is further configured to take out a container from a movable carrier located at the inlet, and place the container on the transmission line; and the container handling apparatus located at the outlet of the transmission line is further configured to obtain the container transported by the transmission line and place the container in a movable carrier located at the outlet.

Optionally, a height of a rail for storing the movable carriers is higher than a height of the first conveying apparatus not carrying the movable carrier; and the first conveying apparatus is further configured to travel to below the high floor storage position, and convey the movable carrier from below the high floor storage position in a piggyback manner and leave the high floor storage position.

Optionally, when the stereoscopic warehouse includes a plurality of lifting apparatuses, specified floors reachable by the plurality of lifting apparatuses are at least overlapped.

Optionally, a rail is provided in the lifting apparatus, and is used to be connected to the rail provided in the high floor, to allow the first conveying apparatus to travel into the lifting apparatus.

Optionally, the control server is further configured to determine, at least partially according to a conveying task to be executed for each high floor, a quantity of first conveying apparatuses required for each high floor, determine, according to the quantity of first conveying apparatuses required for each high floor and a current quantity of first conveying apparatuses on each high floor, first conveying apparatuses that need to be called for each high floor, and send a calling instruction to the first conveying apparatuses that need to be called; and the first conveying apparatus is further configured to travel into the lifting apparatus according to the received calling instruction, and reach a high floor specified by the calling instruction through the lifting apparatus.

Optionally, the high floor connection point is provided in the lifting apparatus; and the first conveying apparatus is further configured to travel to the high floor connection point in the lifting apparatus, and place the movable carrier at the high floor connection point or take out the movable carrier from the high floor connection point.

Optionally, at least some of floors in the high floors are further provided with the container handling apparatus, and the high floor connection points are respectively provided near the container handling apparatus on the high floor and in the lifting apparatus;

the first conveying apparatus is further configured to convey the movable carrier between the high floor storage position and the high floor connection point that is near the container handling apparatus, or convey a cargo carrier between the high floor connection point that is near the container handling apparatus and the high floor connection point in the lifting apparatus; and the container handling apparatus is further configured to take out a container from the movable carrier and place the container in the cargo carrier, or take out a container from the cargo carrier and place the container in the movable carrier.

Optionally, the movable carrier includes legs, and a height of an opening formed by the legs of the movable carrier is higher than a height of the second conveying apparatus not carrying the movable carrier; and the second conveying apparatus is further configured to: selectively travel, when not carrying the movable carrier, below at least some of movable carriers, or convey the movable carrier from below the at least some of movable carriers in a piggyback manner and leave the bottom floor storage position.

Optionally, an interval of columns between at least some of bottom floor storage positions on the bottom floor of the stereoscopic warehouse is greater than a width of the second conveying apparatus, and a height of a lowest point of a connection member between at least two adjacent columns on the bottom floor of the stereoscopic warehouse is higher than the height of the second conveying apparatus not carrying the movable carrier; and the second conveying apparatus is further configured to: selectively travel, when not carrying the movable carrier, between the at least two adjacent columns on the bottom floor.

Optionally, the second conveying apparatus is configured to enter the bottom floor storage position from an aisle position adjacent to the bottom floor storage position, and take out a movable carrier from the bottom floor storage position onto the second conveying apparatus, or place the movable carrier on the second conveying apparatus in the bottom floor storage position.

Optionally, the bottom floor of the stereoscopic warehouse is provided with at least one bottom floor connection point; and the second conveying apparatus is further configured to convey, according to the conveying instruction sent by the control server, the movable carrier indicated by the conveying instruction between the bottom floor storage position and the bottom floor connection point or between the lifting apparatus and the bottom floor connection point.

Optionally, a specified area on the bottom floor of the stereoscopic warehouse is provided with at least one bottom floor connection point; and the second conveying apparatus is configured to: take out the movable carrier from the bottom floor storage position or the lifting apparatus, convey the movable carrier to the bottom floor connection point, and place the movable carrier in the specified area; or take out the movable carrier from the bottom floor connection point in the specified area, and convey the movable carrier to the bottom floor storage position or the lifting apparatus.

Optionally, the system further includes: one or more external temporary storage areas, where the external temporary storage area is in at least one form selected from stereoscopic storage or planar storage;

the external temporary storage area and the at least one stereoscopic warehouse share at least some of the second conveying apparatuses, or the second conveying apparatus conveys and/or connects to the movable carrier between the external temporary storage area and the at least one stereoscopic warehouse; and the control server is further configured to store goods stock information of the external temporary storage area and the at least one stereoscopic warehouse.

Optionally, the container handling apparatus takes out a container from the movable carrier or places a container in the movable carrier in at least one manner selected from sucking, pushing, clamping, grabbing, hooking, holding, or lifting.

Optionally, the movable carrier is a movable rack, the movable rack includes at least one layer of partition, the at least one layer of partition divides the movable rack into at least two layers, at least one storage position is provided on the partition of the movable rack, and each storage position is capable of carrying at least one first container that is capable of accommodating warehouse goods.

Optionally, the container handling apparatus includes a shelf body, the shelf body is provided with a container access assembly and a carrying assembly, and the container access assembly is configured to move on the shelf body; the shelf body includes an X-axis rail and a Y-axis rail that are perpendicular to each other; the Y-axis rail is configured to move along the X-axis rail, and the container access assembly is configured to move along the Y-axis rail; and the container access assembly is capable of taking out a container from a carrier in a Z-axis direction and loading the container onto the carrying assembly, or unloading a container from the carrying assembly and placing the container in a carrier.

Optionally, the shelf body includes a portal frame assembly, and the X-axis rail includes a ground rail structure and an overhead rail structure that is arranged on the portal frame assembly; and two ends of the Y-axis rail are respectively matched with the ground rail structure and the overhead rail structure in a guiding manner.

Optionally, at least two Y-axis rails are provided, and at least one container access assembly is arranged on each Y-axis rail.

Optionally, the container access assembly takes out a container from the carrier or places a container in the carrier in at least one manner selected from sucking, pushing, clamping, grabbing, hooking, holding, or lifting.

This specification provides a scheduling method for stereoscopic warehouse conveying, where there exists at least one or more stereoscopic warehouses, the stereoscopic warehouse is provided with at least two floors, the floors of the stereoscopic warehouse are in communication with each other through at least one lifting apparatus, a bottom floor is provided with one or more container handling apparatuses, at least some of bottom floor storage positions on the bottom floor are provided with movable carriers, each floor in other high floors other than the bottom floor of the stereoscopic warehouse is provided with at least one high floor connection point, the high floors are respectively provided with rails for operation of a first conveying apparatus, at least some of high floor storage positions on the high floors are provided with movable carriers, and the method includes:

determining a conveying task to be executed;

determining, according to the conveying task, a first conveying apparatus, a second conveying apparatus and a lifting apparatus for executing the conveying task, and determining a container handling apparatus for handling a container; and sending a conveying instruction to the determined first conveying apparatus, the determined second conveying apparatus, and the determined lifting apparatus respectively, and sending an operation instruction to the container handling apparatus, where the conveying instruction is used for causing the first conveying apparatus, the second conveying apparatus, and the lifting apparatus to cooperate to convey a movable carrier from a high floor storage position or a bottom floor storage position of the stereoscopic warehouse to the container handling apparatus arranged on the bottom floor, or convey a movable carrier from the container handling apparatus arranged on the bottom floor to a high floor storage position or a bottom floor storage position of the stereoscopic warehouse; and the operation instruction is used for causing the container handling apparatus to take out a container from the movable carrier or place a container in the movable carrier.

The at least one technical solution adopted in the embodiments of the present specification can achieve the following beneficial effects:

A first conveying apparatus and a second conveying apparatus are used in a stereoscopic warehouse in a combined manner, and a conveying function of a lifting apparatus in the stereoscopic warehouse is used, so that the first conveying apparatus and the second conveying apparatus can cooperate in a dense storage warehouse to convey a movable carrier; a container handling apparatus is arranged to take out goods from the movable carrier or place goods in the movable carrier, and a plurality of containers may be placed in the movable carrier, so that the utilization of storage space is improved; and the container handling apparatus is used to effectively store a container in the movable carrier or take out a container from the movable carrier, so that the sorting efficiency of the goods in the stereoscopic warehouse is improved, the warehouse operation costs are reduced, and the conveying efficiency is improved.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings.

DETAILED DESCRIPTION

To make the objectives, technical solutions, and advantages of this specification clearer, the technical solutions of this application will be clearly and completely described below with reference to specific embodiments of this specification and corresponding accompanying drawings. Apparently, the described embodiments are only some but not all of the embodiments of this application. All other embodiments obtained by a person of ordinary skill in the art based on the embodiments of this specification without creative efforts shall fall within the protection scope of this application.

The following describes the technical solutions provided in the embodiments of this application in detail with reference to the accompanying drawings.

Figure 1A:
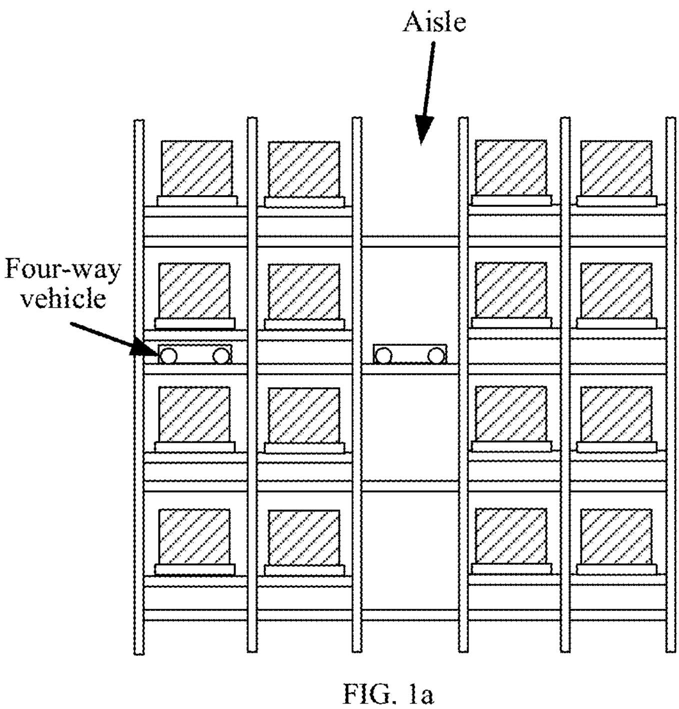
FIG. 1*a* is a schematic cross-sectional structural view of an existing warehouse.
Figure 1B:
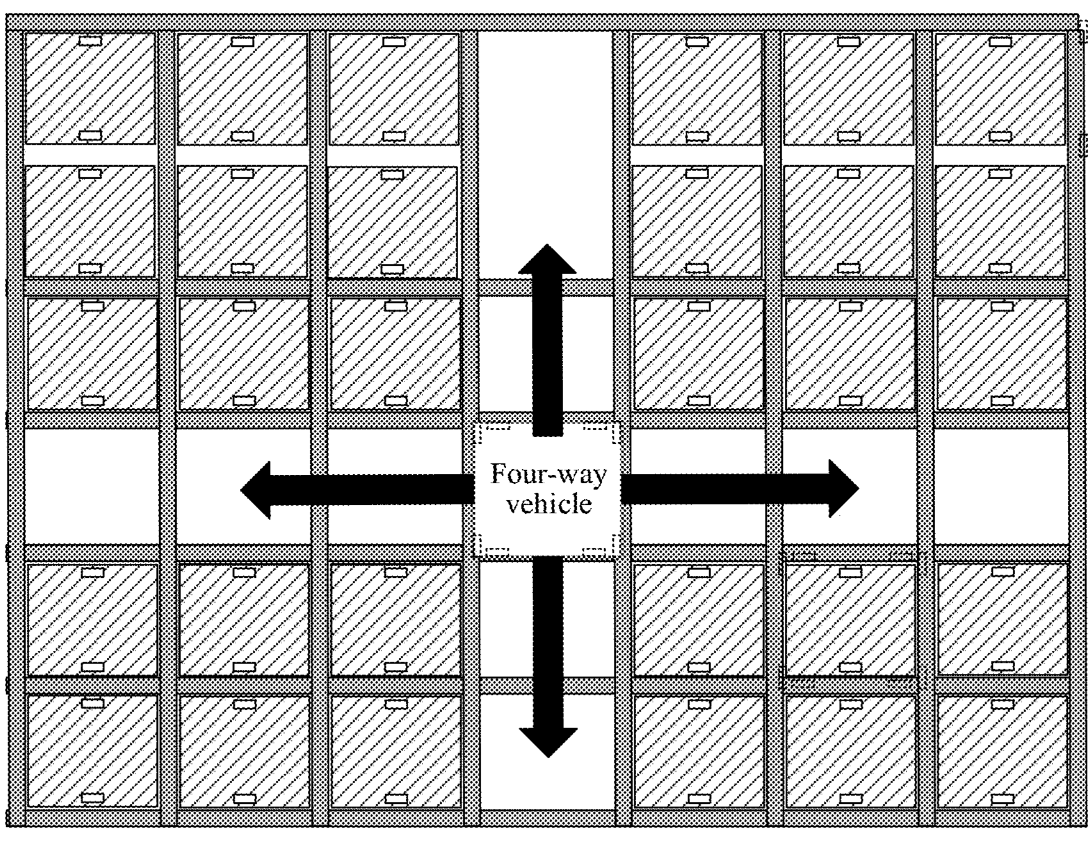
FIG. 1*b* is a schematic top structural view of an existing warehouse.
Figure 2:
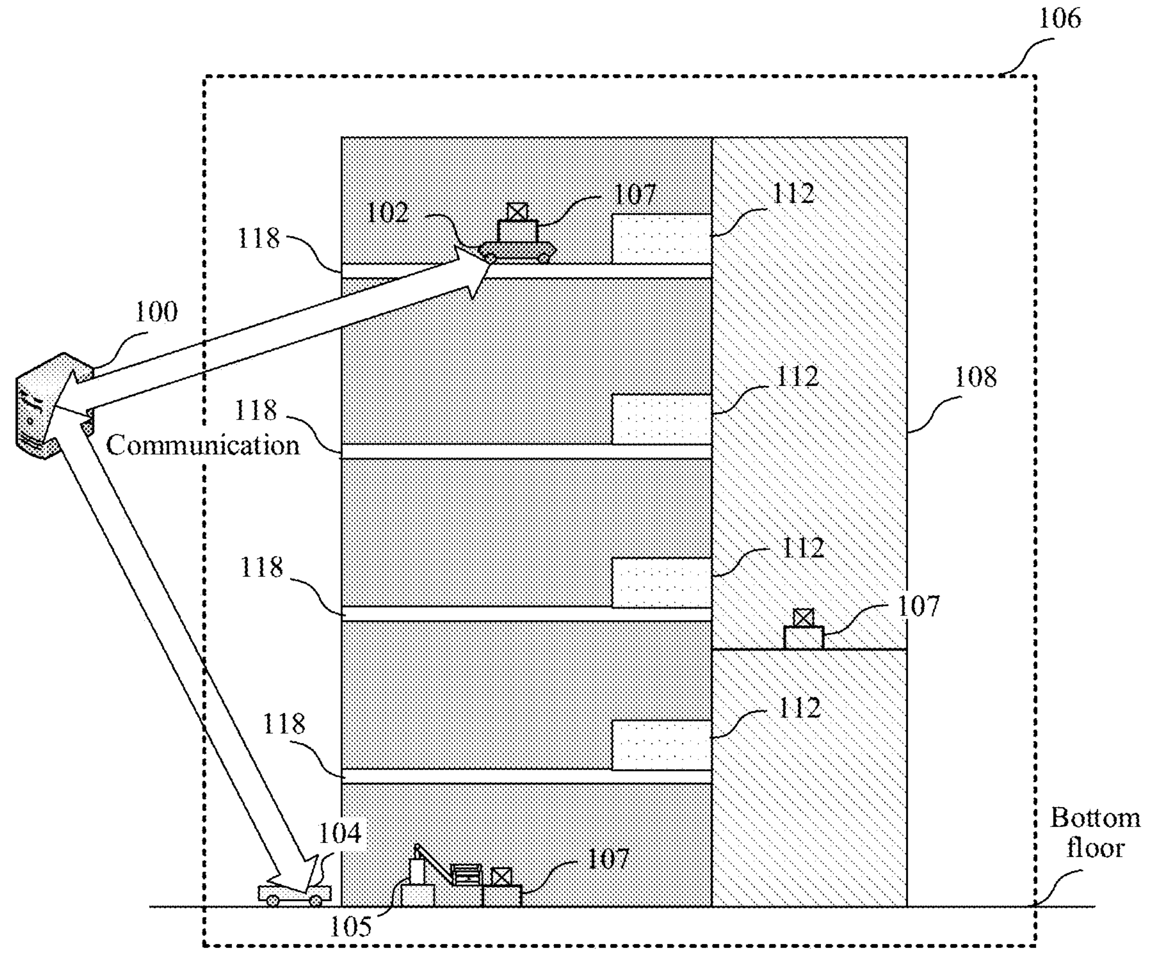
FIG. 2 is a schematic diagram of a stereoscopic warehouse scheduling system according to an embodiment of this specification.

FIG. 2 is a schematic diagram of a stereoscopic warehouse scheduling system according to an embodiment of this specification. This system includes: one or more control servers 100, one or more first conveying apparatuses 102, one or more second conveying apparatuses 104, at least one stereoscopic warehouse 106, at least one lifting apparatus 108, and one or more container handling apparatuses 105, where the stereoscopic warehouse 106 is provided with at least two floors, the floors of the stereoscopic warehouse 106 are in communication with each other through the at least one lifting apparatus 108, and the control server 100 communicates with the first conveying apparatus 102 and the second conveying apparatus 104 respectively. That is, in this specification, the stereoscopic warehouse 106 may at least be divided into one bottom floor and one high floor. Certainly, an objective of the stereoscopic warehouse is to improve the space utilization in a vertical direction. Therefore, the stereoscopic warehouse 106 generally includes a plurality of floors, namely, one bottom floor and several high floors.

In addition, storage positions provided on the bottom floor of the stereoscopic warehouse 106 are bottom floor storage positions, and storage positions provided on the high floor are high floor storage positions. At least some of bottom floor storage positions on the bottom floor of the stereoscopic warehouse 106 are provided with movable carriers 107, and similar, at least some of high floor storage positions on the high floors of the stereoscopic warehouse 106 are also provided with movable carriers 107.

In FIG. 2, for ease of understanding, only one control server 100 and one stereoscopic warehouse 106 are included.

An objective of storing goods in a warehouse is to store a plurality of bulk cargoes intensively. For example, for ease of picking up required goods according to an order requirement, goods in the stereoscopic warehouse in the system provided in this specification are carried by a container, the container is placed in a movable carrier 107, and the movable carrier 107 needs to be transported by the first conveying apparatus 102, the second conveying apparatus 104, and the lifting apparatus 108. Therefore, a conveying task in this specification is also to implement goods picking up and may be determined by the control server 100 according to an order. Similarly, in this specification, an operation can be performed on the goods carried or accommodated by the container only after the container is taken out from the movable carrier 107. Therefore, to implement goods picking up, the container handling apparatus 105 needs to perform an operation on the movable carrier 107 to take out the container or place the container in the movable carrier 107. Certainly, an operation instruction for the container handling apparatus 105 may also be determined by the control server 100 according to an order.

In addition, the movable carrier 107 may specifically be in a form of a rack, that is, a movable rack, or the movable carrier 107 may alternatively be in a form such as a tray bracket, a cage trolley, or a pallet bracket, provided that the movable carrier is a carrier that is movable and is configured to place a container (carrying or accommodating goods) or goods. A specific form of the movable carrier 107 is not limited in this specification. In addition, the movable carrier 107 may be configured to place a single container, or may be configured to place a plurality of containers, which is not limited in this specification as well.

In this specification, the container configured to place goods may specifically be a container in any form that may accommodate the goods such as a material box, a paper box, or a tray, which is not limited in this specification.

When the movable carrier 107 is configured to place a plurality of containers, to improve the space utilization of the movable carrier 107, the movable carrier 107 is a movable rack, the movable rack includes at least one layer of partition, the at least one layer of partition divides the movable rack into at least two layers, at least one storage position is provided on the partition of the movable rack, and each storage position is capable of carrying at least one first container (for example, a cargo box) that is capable of accommodating warehouse goods.

Figure 3:
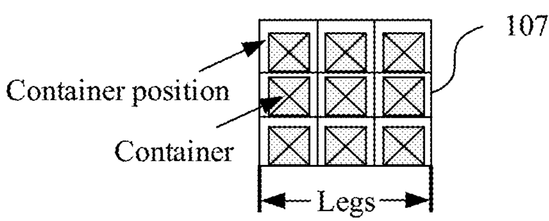
FIG. 3 is a schematic diagram of a movable carrier according to this specification.

FIG. 3 is a schematic diagram of a movable carrier according to this specification. This figure shows a front view of the movable carrier 107, and it can be seen from FIG. 3 that container positions for placing containers in the movable carrier 107 are densely arranged, to improve the space utilization of the movable carrier 107. It can be seen that the movable carrier 107 includes legs, several container positions are spaced in the movable carrier 107, the container positions are densely arranged in an array, and containers may be placed in the container positions from a front surface or a back surface of the movable carrier 107, or may be taken out from a front surface or a back surface of the movable carrier 107. A gap reserved between the container position and a contained placed in the container position is not enough to take out goods in the container, that is, to take out the goods from the container or place the goods in the container, the container needs to be taken out from the movable carrier 107 first.

Further, when the movable carrier 107 is a carrier (for example, a cage trolley) having wheels, it may be considered that wheels are mounted below support columns of the cage trolley, and since the support columns support a body of the cage trolley, the support columns belong to the foregoing leg. That is, a form of the leg is not limited in this specification, and any structure that is configured to support a platform for placing containers in a carrier may be considered as a leg.

In one or more embodiments of this specification, during goods sorting, the control server 100 is configured to determine, according to a received order, a conveying task corresponding to the order, determine, according to the conveying task, a first conveying apparatus 102, a second conveying apparatus 104, and a lifting apparatus 108 for executing the conveying task, respectively send a conveying instruction for executing the conveying task to the first conveying apparatus 102, the second conveying apparatus 104, and the lifting apparatus 108 respectively, determine a container handling apparatus 105 for handling a container, and send an operation instruction for executing a goods take-out task or a goods storage task corresponding to the conveying task to the container handling apparatus 105.

Specifically, when goods in containers in the stereoscopic warehouse 106 are picked up, a storage position where a movable carrier 107 in which goods that need to be picked are stored is located needs to be first determined according to the goods. The storage position may be a position in which the movable carrier 107 is placed, and several storage positions may be provided on each floor of the stereoscopic warehouse as required for placing movable carriers 107. After the movable carrier 107 in which the goods are stored is determined, a conveying task is executed through conveying apparatuses, so that the goods in a container stored in the movable carrier 107 is delivered to the container handling apparatus 105, and the container handling apparatus 105 takes out the container in the movable carrier 107, to pick up the goods placed in the container. After picking up is completed, the container handling apparatus 105 loads the container storing remaining goods in the movable carrier 107, and the conveying apparatuses convey the movable carrier 107 into the warehouse for storage. Therefore, the conveying task in this specification is a task executed for conveying the movable carrier 107 in which the goods are loaded to implement goods sorting.

In this specification, movement of the movable carrier 107 on the high floor may be implemented by the first conveying apparatus 102, and movement of the movable carrier 107 on the bottom floor may be implemented by the second conveying apparatus 104.

The first conveying apparatus 102 is configured to take out or place, according to the conveying instruction sent by the control server 100, a movable carrier 107 indicated by the conveying instruction from or in a high floor storage position, and convey the movable carrier 107 indicated by the conveying instruction between the high floor storage position and a high floor connection point 112.

The second conveying apparatus 104 is configured to take out or place, according to the conveying instruction sent by the control server, the movable carrier 107 indicated by the conveying instruction from or in a bottom floor storage position, and convey the movable carrier 107 indicated by the conveying instruction between the lifting apparatus 108 and the bottom floor storage position, between the lifting apparatus 108 and the container handling apparatus 105, or between the bottom floor storage position and the container handling apparatus 105.

The container handling apparatus 105 is configured to take out, according to the operation instruction sent by the control server 100, a container from the movable carrier 107 conveyed by the second conveying apparatus 104, or place a container in the movable carrier 107 conveyed by the second conveying apparatus 104.

During goods picking up, the container handling apparatus 105 needs to take out, according to the operation instruction, the container in which the goods are stored of the movable carrier 107 conveyed by the second conveying apparatus 104, after picking up of the to-be-taken-out goods is completed, the container handling apparatus 105 places the container storing remaining goods in a corresponding movable carrier 107, the second conveying apparatus 104 then conveys the movable carrier 107 to a corresponding bottom floor storage position to store the movable carrier 107, or the second conveying apparatus 104 conveys the movable carrier 107 into the lifting apparatus 108, and the first conveying apparatus 102 conveys the movable carrier 107 into a high floor storage position for storage.

Therefore, the control server 100 is further configured to determine a movable carrier 107 in which the container storing the remaining goods needs to be stored. In addition, when the movable carrier 107 may be configured to place a plurality of containers, the control server 100 is further configured to determine a specific container position in which the container storing the remaining goods is stored in the movable carrier 107. Certainly, the control server 100 is further configured to determine a storage position in which the movable carrier 107 in which the container storing the remaining goods is placed is currently located, and the first conveying apparatus 102 and/or the second conveying apparatus convey the movable carrier 107 to the container handling apparatus 105.

In this way, after the goods are taken out by the container handling apparatus 105 of the movable carrier 107 and picked up at a picking station, the container handling apparatus 105 further places the container storing the remaining goods in the movable carrier 107 conveyed by the second conveying apparatus 104. Then, the control server 100 may determine a storage position in which the movable carrier 107 needs to be stored, to determine a path for conveying the movable carrier 107, determine, according to the path, the first conveying apparatus 102, the second conveying apparatus 104, and the lifting apparatus 108 for executing the conveying task, and respectively send the conveying instruction for executing the conveying task to the first conveying apparatus 102, the second conveying apparatus 104, and the lifting apparatus 108 respectively. The stereoscopic warehouse 106 completes goods sorting through the foregoing process.

It should be further noted that, in this specification, the stereoscopic warehouse 106 implementing goods picking up and the stereoscopic warehouse scheduling system are not only applicable to picking up of products and goods in a warehousing scenario, but also applicable to picking up of goods such as finished products, semi-finished products, or semi-processed products in a factory production scenario, where goods that are picked up are used for implement a production link or a production node. An application scenario of goods picking up is not specifically limited in this specification.

In addition, in this specification, at least one bottom floor storage position is provided on the bottom floor of the stereoscopic warehouse 106, and the bottom floor storage position is used for placing the movable carrier 107 conveyed by the second conveying apparatus 104. The bottom floor storage position may be provided on the bottom floor as required, and when the bottom floor storage position is provided at different positions, different areas for placing the movable carrier 107 may be formed on the bottom floor, and an empty position between the areas for placing the movable carrier 107 may serve as an aisle for the second conveying apparatus 104 to pass when the movable carrier 107 is carried.

It can be seen from FIG. 2 that, each floor in other high floors other than the bottom floor of the stereoscopic warehouse 106 is provided with at least one high floor connection point 112, the high floors are respectively provided with rails 118 for operation of the first conveying apparatus 102, and at least some of high floor storage positions on the high floors are provided with movable carriers 107.

Further, in this specification, the container in the movable carrier 107 may store goods stored in the warehouse or may serve as an idle container without goods stored. That is, the container in the movable carrier 107 does not need to be fully used to place goods. In addition, the movable carrier 107 may be placed in the storage position provided on each floor in the stereoscopic warehouse 106, or the movable carrier 107 is not placed when the stereoscopic warehouse is in an idle state. An occupation rate of storage positions on each floor, that is, a ratio of a quantity of storage positions in which the movable carrier 107 is arranged to a total quantity of the storage positions, may be configured as required. A container occupation rate of each movable carrier 107 is a ratio of a quantity of containers in which goods are stored in the movable carrier 107 to a total quantity of containers in the movable carrier 107, a container position occupation rate of each movable carrier 107 is a ratio of a quantity of containers stored in the movable carrier 107 to a total quantity of container positions, and both the two occupation rates may be configured as required. An occupation rate of high floor storage positions on each high floor may be set between 0% and 100%, and an occupation rate of bottom floor storage positions on the bottom floor may be set between 0% and 100%. Similarly, the container occupation rate and the container position occupation rate of each movable carrier 107 may also be set as required. Therefore, for a movable carrier 107, each container stored in the movable carrier 107 may store goods or may be idle, and container positions of the movable carrier 107 may also include a container position in which no container is stored.

Since movable carriers 107 are densely stored in the storage positions in the stereoscopic warehouse 106, when the first conveying apparatus 102 or the second conveying apparatus 104 carries a movable carrier 107, the conveying apparatus cannot directly travel from one storage position to another adjacent storage position. Therefore, aisles are provided on each floor of the stereoscopic warehouse 106, for the first conveying apparatus 102 or the second conveying apparatus 104 to pass when a movable carrier 107 is carried. The second conveying apparatus 104 is further configured to enter the bottom floor storage position from an aisle position adjacent to the bottom floor storage position, and take out a movable carrier 107 from the bottom floor storage position onto the second conveying apparatus 104, or place the movable carrier 107 on the second conveying apparatus 104 in the bottom floor storage position.

Figure 4:
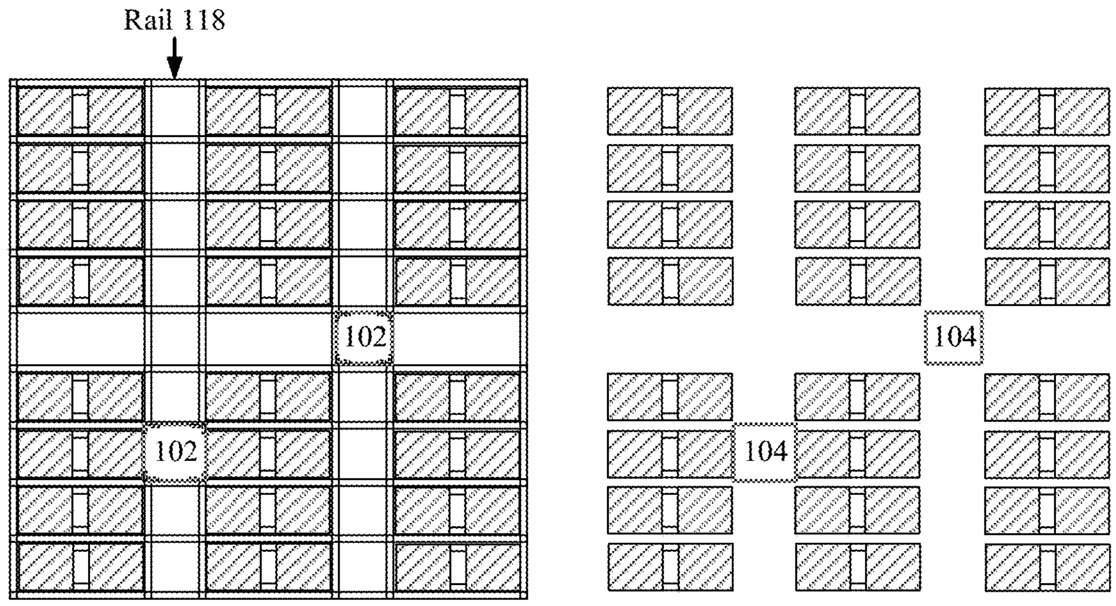
FIG. 4 is a schematic top view of a stereoscopic warehouse according to an embodiment of this specification.

FIG. 4 is a schematic top view of a stereoscopic warehouse according to this specification. The left side is a schematic diagram of a high floor, and it can be seen that the high floor includes a rail 118, so that the first conveying apparatus 102 may travel on the rail 118. The right side is a schematic diagram of a bottom floor, and it can be seen that the bottom floor does not include the rail 118. In addition, it can be seen from the top view that aisles are provided on each floor of the stereoscopic warehouse 106, and the aisle is provided for the first conveying apparatus 102 or the second conveying apparatus 104 to pass.

In addition, it should be noted that, in this specification, aisle layouts on different floors may be not completely the same, and may specifically be set as required. In a dense storage warehouse, if a movable carrier 107 in a storage position that is not adjacent to an aisle needs to be conveyed, a movable carrier 107 in a storage position adjacent to the aisle needs to be first conveyed out, so that the storage position adjacent to the aisle serves as a temporary aisle, and the conveying apparatus then conveys out goods in the storage position that is not adjacent to the aisle. Therefore, in consideration of the conveying efficiency, stock keeping units (stock keeping unit, SKU) of goods in containers stored the movable carriers 107 in the storage position that is not adjacent to the aisle and the storage position adjacent to the aisle and adjacent to the storage position are the same. In this case, an arrangement sequence of storage positions and aisles in the warehouse may be as follows: one aisle, four storage positions, and one aisle, as shown in FIG. 5*a*, which can increase the storage density of goods without affecting the operation efficiency of the warehouse.

Figure 5A:
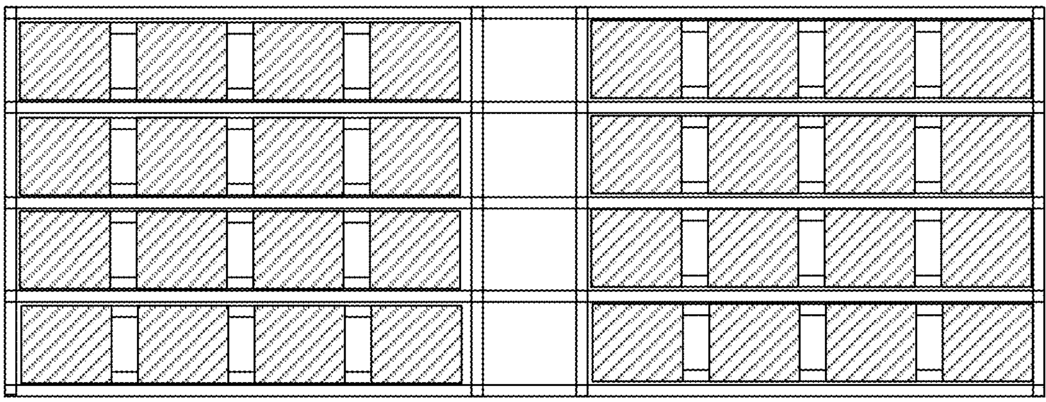
FIG. 5*a* and FIG. 5*b* are schematic diagrams of warehouse layouts according to embodiments of this specification.

However, when a single SKU does not include enough goods and needs to be stored in two or more storage positions, the layout shown in FIG. 5*a* may affect the operation efficiency of the warehouse. Therefore, a layout shown in FIG. 5*b* may be generally used, namely, an arrangement sequence of storage positions and aisles in the warehouse is as follows: one aisle, two storage positions, and one aisle.

Figure 5B:
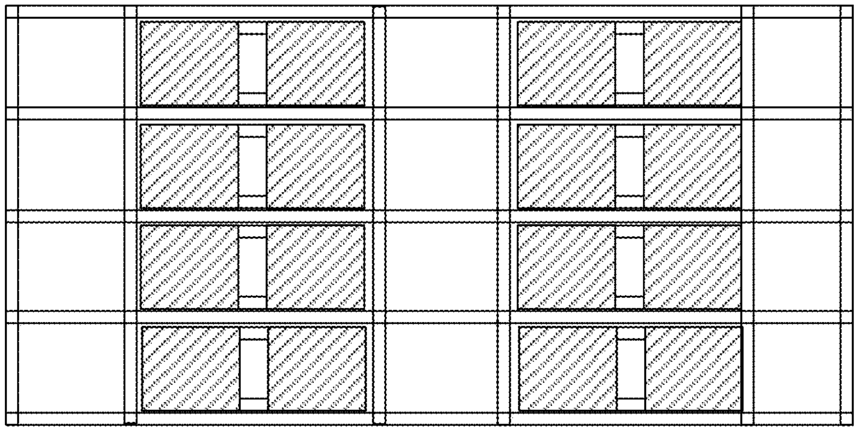

In this specification, each floor in the stereoscopic warehouse may use the layout shown in FIG. 5*a* or FIG. 5*b*, or a layout in which the two layouts are mixed, which is not limited in this specification. In addition, each floor may use a layout that is not completely the same as that of another floor according to a goods storage requirement. For example, a floor A stores products that occupy relatively large space, where a single SKU includes enough goods and needs to be stored by a movable carrier 107 corresponding to two or more storage positions, so that the floor A may fully use the layout in FIG. 5*a*; and a floor A+1 stores products that occupy relatively small space, so that the floor A+1 may fully use the layout in FIG. 5*b*.

In this specification, the first conveying apparatus 102 may specifically be a conveying apparatus traveling on a rail, for example, a four-way shuttle vehicle. The second conveying apparatus 104 may specifically be a conveying apparatus traveling on a flat surface, for example, an automated guided vehicle (AGV). Certainly, specific forms of the first conveying apparatus 102 and the second conveying apparatus 104 are not limited in this application, and may specifically be set as required, provided that the first conveying apparatus 102 may travel along a rail and convey a movable carrier 107 in a high floor storage position, and the second conveying apparatus 104 may travel on the bottom floor and convey a movable carrier 107 in a bottom floor storage position.

In this specification, the movable carrier 107 possibly needs to be conveyed to move between different floors of the stereoscopic warehouse 106. Therefore, the lifting apparatus 108 is configured to ascend or descend to a specified floor according to the conveying instruction sent by the control server 100, and at least convey one or a combination selected from the movable carrier 107 indicated by the conveying instruction, the first conveying apparatus 102, and the second conveying apparatus 104 between the floors.

The specified floor is a floor that the lifting apparatus 108 needs to reach when executing a conveying task. For example, if a movable carrier 107 needs to be conveyed from the third floor to the bottom floor, the control server 100 may respectively send two conveying instructions to the lifting apparatus 108, the lifting apparatus 108 reaches the third floor (that is, a specified floor indicated by the conveying instruction received for the first time) according to the conveying instruction received for the first time, and when the movable carrier 107 has been conveyed into the lifting apparatus 108, the lifting apparatus 108 may reach the bottom floor (that is, a specified floor indicated by the conveying instruction received for the second time) according to the conveying instruction received for the second time. Certainly, the foregoing is only an example, and in the foregoing example, the control server 100 may alternatively send one conveying instruction only, and the specified floor is respectively the third floor and the bottom floor according to a sequence, so that the lifting apparatus 108 reaches the third floor and the bottom floor sequentially according to the conveying instruction and conveys the movable carrier 107 on the third floor to the bottom floor.

In addition, in this specification, the movable carrier 107 includes legs, and due to an opening formed by the legs, a distance between the movable carrier 107 and the rail 118 is greater than a height of the first conveying apparatus 102 not carrying the movable carrier 107. Further, the first conveying apparatus 102 may travel to below the high floor storage position, and convey the movable carrier 107 from below the high floor storage position in a piggyback manner and leave the high floor storage position. That is, a height of the leg of the movable carrier 107 is higher than a height of the first conveying apparatus 102 not carrying the movable carrier 107.

In this specification, the second conveying apparatus 104 is further configured to: selectively travel, when not carrying the movable carrier 107, below at least some of bottom floor storage positions, or convey the movable carrier 107 from below the at least some of bottom floor storage positions in a piggyback manner. Therefore, the height of the opening formed by the legs of the movable carrier 107 is higher than a height of the second conveying apparatus 104 not carrying the movable carrier 107 is carried. The second conveying apparatus 104 is further configured to: selectively travel, when not carrying the movable carrier 107, below at least some of movable carriers 107, or convey the movable carrier 107 from below the at least some of movable carriers 107 in a piggyback manner and leave the bottom floor storage position.

In this specification, each storage position may be encircled by several columns, an interval of columns between at least some of bottom floor storage positions on the bottom floor of the stereoscopic warehouse 106 is greater than a width of the second conveying apparatus 104, and a height of a lowest point of a connection member between at least two adjacent columns on the bottom floor of the stereoscopic warehouse 106 is higher than the height of the second conveying apparatus 104 not carrying the movable carrier 107. The second conveying apparatus 104 is further configured to: selectively travel, when not carrying the movable carrier 107, between the at least two adjacent columns on the bottom floor.

Certainly, the movable carrier 107 may be supported by the legs thereof, so that the columns in this specification are configured to support the stereoscopic warehouse 106 and are not configured to support the movable carrier 107. The high floor storage position and the bottom floor storage position may alternatively not be encircled by the columns, and a storage position may be set as required. For example, a QR code used for positioning may be set, so that the first conveying apparatus 102 and the second conveying apparatus 104 determine a storage position in which the movable carrier 107 is placed.

In this specification, a workstation may be arranged in the stereoscopic warehouse 106. The container handling apparatus 105 arranged on the bottom floor of the stereoscopic warehouse 106 may be located in a bottom floor workstation, the workstation may further include a transmission line and a picking station, and an inlet and an outlet of the transmission line are respectively provided with the container handling apparatus 105. The picking station in the workstation is located in a transmission path of the transmission line.

In this specification, the container handling apparatus 105 located at the inlet of the transmission line is further configured to take out a container from a movable carrier 107 located at the inlet, and place the container on the transmission line. The container handling apparatus 105 located at the outlet of the transmission line is further configured to obtain the container transported by the transmission line and place the container in a movable carrier 107 located at the outlet.

Figure 6:
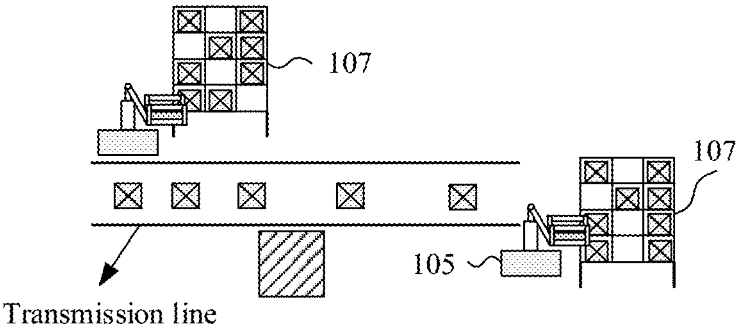
FIG. 6 is a schematic diagram of a transmission line according to an embodiment of this specification.

FIG. 6 is a schematic diagram of a transmission line according to this specification. As shown in the figure, containers are transported by the transmission line, and the container handling apparatus 105 may take out a container in a movable carrier 107 at the inlet of the transmission line onto the transmission line. A rectangle filled with oblique lines in the figure represents a picking station. It can be seen that the picking station is arranged in the transmission path of the transmission line and is configured to sort the containers transported by the transmission line. At the outlet of the transmission line, the container handling apparatus 105 places containers left after sorting in a nearby movable carrier 107. The transmission line in FIG. 6 is only an example and may alternatively be in another form, for example, the transmission line may be an annular transmission line, and the inlet and the outlet of the transmission line may be located at the same position.

In addition, in one or more embodiments of this specification, the movable carrier 107 may store a plurality of containers loaded with goods, the container handling apparatus 105 needs to independently take out or place each container stored in the movable carrier 107 from or in the movable carrier 107. Therefore, the container handling apparatus 105 may include a first sensor. The first sensor is configured to determine, when a container is to be taken out from the movable carrier 107, whether a corresponding container position in the movable carrier 107 has the container, or determine, when a container in the movable carrier 107 is to be placed, whether a corresponding container position in the movable carrier 107 is empty. The corresponding container position is a container position in which a container loaded with goods that needs to be taken out is located, or a container position in which a container loaded with goods needs to be placed.

When the movable carrier 107 includes a plurality of container positions, the container handling apparatus 105 needs to adjust a pose when a container in a different container position is to be taken out or a container in a different container position is to be placed, to be aligned with the corresponding container position. Therefore, the container handling apparatus 105 may further include a second sensor, and the second sensor is configured to determine a pose deviation between the container handling apparatus 105 and the corresponding container position in the movable carrier 107, to adjust the pose, so that the container handling apparatus 105 may be aligned with the container position in the movable carrier 107.

Further, the container handling apparatus 105 is further configured to adjust, according to the pose deviation between the container handling apparatus 105 and the corresponding container position that is determined by the second sensor, the pose of the container handling apparatus 105, to eliminate the pose deviation. After the pose deviation is eliminated, the container is then placed in the corresponding container position, or the container is taken out from the corresponding container position.

In this specification, the first sensor and the second sensor may be different sensors, or the first sensor and the second sensor may be the same sensor. The first sensor and the second sensor may specifically be image sensors. Alternatively, when the first sensor and the second sensor are different sensors, the first sensor may alternatively be a distance sensor, and the second sensor is an image sensor. Certainly, the first sensor may be, for example, an ultrasonic radar, a laser radar, or the like, provided that the first sensor can determine whether a container exists in the container position, and similarly, the second sensor may be, for example, an ultrasonic radar, a binocular vision system, a depth sensor, or the like, provided that the second sensor can determine the pose deviation between the container handling apparatus 105 and the corresponding container position.

Further, in this specification, the movable carrier 107 may be configured to carry only one container, and the first sensor arranged on the container handling apparatus 105 is configured to determine whether the movable carrier 107 carries a container.

However, since the movable carrier 107 may be configured to carry only one container, it is generally unnecessary to determine whether a container is placed in the movable carrier 107 through a sensor. In this case, it is necessary to only determine a pose deviation through the sensor, adjust the pose of the container handling apparatus 105, to eliminate the pose deviation (for example, when the pose deviation is less than or equal to a preset deviation tolerance value, it is considered that the pose deviation is eliminated). Therefore, when the movable carrier 107 is configured to carry one container, a sensor arranged on the container handling apparatus 105 may be configured to implement a function of the second sensor only.

In this specification, when a container is taken out, the container handling apparatus 105 may alternatively not be aligned with the container position but be aligned with the container, and information facilitating recognition of the first sensor may be set on the container, for example, a QR code that is used for alignment and may be recognized by the first sensor. Certainly, when the pose deviation is determined and the pose deviation is eliminated, an object to be aligned with the container handling apparatus 105 is not limited, for example, the container handling apparatus may be aligned with a container, a container position, or a movable carrier 107.

In one or more embodiments of this specification, the container handling apparatus 105 may take out a container from the movable carrier 107 or place a container in the movable carrier 107 in at least one manner selected from sucking, pushing, clamping, grabbing, hooking, holding, or lifting. A specific manner used by the container handling apparatus 105 to take out or place a container is not limited in this specification. For movable carriers 107 in different forms, operations for taking out or placing a container may also be limited. Therefore, the manner used by the container handling apparatus 105 to take out or place a container in the stereoscopic warehouse 106 at least matches the movable carrier 107.

Figure 7A:
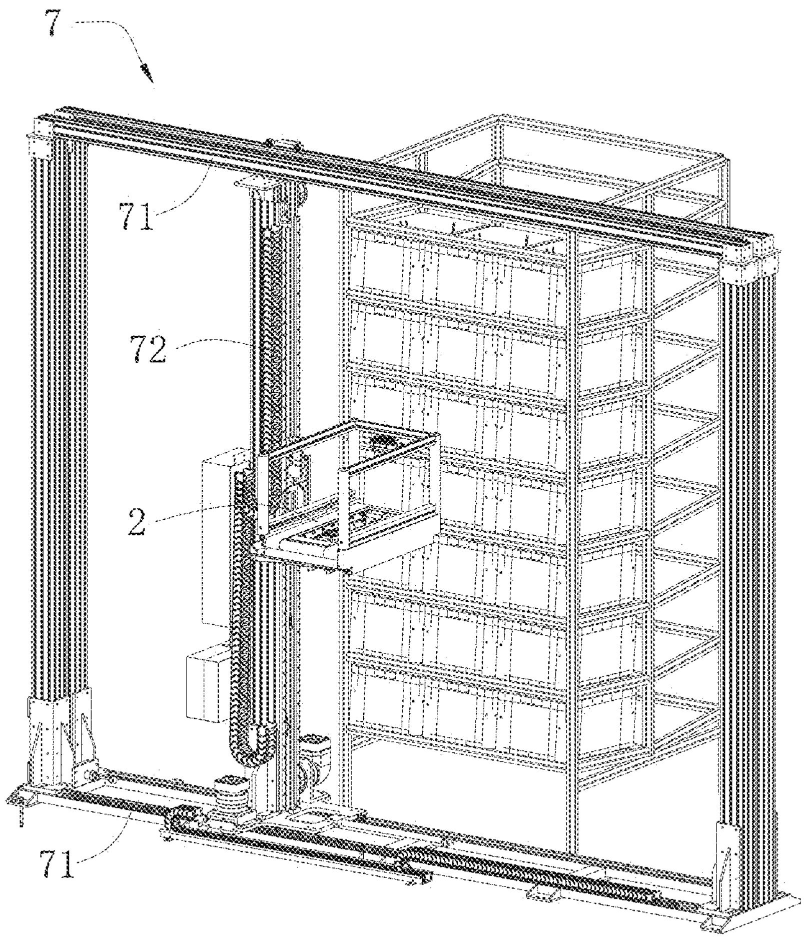
FIG. 7*a* is a schematic diagram of a container handling mechanism according to an embodiment of this specification.

As shown in FIG. 7*a*, FIG. 7*a* shows a schematic diagram of a container handling mechanism. The container handling mechanism includes a shelf body 7, the shelf body 7 is provided with a container access assembly 2 and a carrying assembly, the shelf body 7 includes an X-axis rail 71 and a Y-axis rail 72 that are perpendicular to each other, and the X-axis rail 71 and the Y-axis rail 72 are provided in a vertical plane. Specifically, the Y-axis rail is configured to move along the X-axis rail, and the container access assembly is configured to move along the Y-axis rail; and the container access assembly 2 is capable of taking out a container from a carrier in a Z-axis direction and loading the container onto the carrying assembly, or unloading a container from the carrying assembly and placing the container in a carrier. The X axis, the Y axis, and the Z axis form a three-dimensional coordinate system.

In an implementation, the shelf body 7 includes a portal frame assembly, and the X-axis rail 71 includes a ground rail structure and an overhead rail structure that is arranged on the portal frame assembly. The X-axis rail 71 extends in a horizontal direction, and the Y-axis rail 72 extends in a vertical direction. The Y-axis rail 72 may be a column structure, two ends of the Y-axis rail 72 are respectively matched with the ground rail structure and the overhead rail structure in a guiding manner, and the Y-axis rail 72 horizontally moves along the ground rail structure and the overhead rail structure.

Specifically, an X-axis moving plate is respectively arranged on the two X-axis rails 71, the X-axis moving plate can move in the horizontal direction along the X-axis rail 71, and the two ends of the Y-axis rail 72 are respectively fixedly connected to the two X-axis moving plates. A Y-axis moving plate is arranged on the Y-axis rail 72, the Y-axis moving plate can move in the vertical direction along the Y-axis rail 72, and the container access assembly 2 is fixedly connected to the Y-axis moving plate. Guiding assemblies may be further mounted on the X-axis moving plates and the Y-axis moving plate, and the moving plates slide along the corresponding X-axis rails 71 and the Y-axis rail 72 through the guiding assemblies.

A drive system is further arranged on the shelf body 7, and the drive system includes an X-axis drive unit and a Y-axis drive unit. The X-axis drive unit is configured to drive the Y-axis rail 72 to move along the X-axis rail 71, and the Y-axis drive unit is configured to drive the container access assembly to move along the Y-axis rail 72, so that the container access assembly 2 may move to a corresponding position, for example, to correspond to a target position on the carrier. The drive system may include a drive motor, a drive gear, a drive chain, a screw rod component, and the like, and a person skilled in the art can set based on the related art to implement the foregoing functions of the drive system.

In an implementation of the present disclosure, at least two Y-axis rails 72 may be provided, and the at least two Y-axis rails 72 move independent of each other between the two X-axis rails 71. At least one container access assembly is arranged on each Y-axis rail, and the container access assembly 2 on each Y-axis rail may move independently, thereby improving the working efficiency of the container handling mechanism.

In this embodiment, the container handling mechanism is configured to transfer the container in the carrier, and the container access assembly 2 can move on the shelf body 7 along the X-axis rail 71 and the Y-axis rail 72 to move to the target position on the carrier.

In a possible implementation, the carrier may be a movable rack, and the container may be a cargo box on the movable rack.

During actual application, the container access assembly 2 takes out or places a container in at least one manner selected from sucking, pushing, clamping, grabbing, hooking, holding, or lifting.

In addition, in this specification, after the control server 100 determines a conveying task according to an order, and controls at least one selected from the first conveying apparatus 102, the second conveying apparatus 104, and the lifting apparatus 108 to convey the movable carrier 107 to the container handling apparatus 105 to take out a container or place a container in the movable carrier 107, the control server 100 may be further configured to determine a conveying task for placing the movable carrier 107 back to a storage position.

The control server 100 may further schedule at least one selected from the first conveying apparatus 102, the second conveying apparatus 104, and the lifting apparatus 108, to place the movable carrier 107 back to the stereoscopic warehouse, where the movable carrier 107 may be placed back to an original storage position, or the movable carrier 107 may be placed back to another storage position. That is, after operations such as picking up are performed on the conveyed movable carrier 107, the system may still place the movable carrier 107 back to an original position. For example, it is assumed that the second conveying apparatus 104 conveys a movable carrier 107 in a bottom floor storage position A1 to the container handling apparatus 105 for picking up, after picking up is ended, the control server 100 may send a conveying instruction to the second conveying apparatus 104, to schedule the second conveying apparatus 104 to place the movable carrier 107 back from the container handling apparatus 105 to the bottom floor storage position A1.

Alternatively, to reduce operation pressure of the first conveying apparatus 102, the second conveying apparatus 104, and the lifting apparatus 108, more transport capacity is used to transport the movable carrier 107 to the workstation rather than transporting the movable carrier 107 back to the original storage position. The control server 100 may determine, for a determined movable carrier 107 that needs to be placed back to a storage position, an idle storage position that is closest to the movable carrier 107, and place the movable carrier 107 in the determined idle storage position by scheduling at least one selected from the first conveying apparatus 102, the second conveying apparatus 104, and the lifting apparatus 108. That is, when the system places a movable carrier 107 in a storage position, a nearby placement policy may be used, and the storage position is determined through the control server 100.

Alternatively, since a plurality of workstations may be arranged in the stereoscopic warehouse 106, that is, a plurality of picking up, tallying, and delivery tasks may be executed concurrently, a case that after a movable carrier 107 is moved out of a storage position, another movable carrier 107 is placed in the storage position under scheduling of another conveying task may occur. When the movable carrier 107 is placed back, the control server 100 determines that another movable carrier 107 has been placed in the original storage position, so that the control server 100 may determine another storage position, and call at least one selected from the first conveying apparatus 102, the second conveying apparatus 104, and the lifting apparatus 108 to place the movable carrier 107 in the another storage position.

Certainly, in one or more embodiments of this specification, the control center 100 may further determine, from any idle storage position (including a high floor storage position and a bottom floor storage position) a storage position for placing the movable carrier 107, and call at least one selected from the first conveying apparatus 102, the second conveying apparatus 104, and the lifting apparatus 108 to transport the movable carrier 107 back to the storage position.

Further, to further improve the operation efficiency of the stereoscopic warehouse 106, in one or more embodiments of this specification, the control center 100 may determine, for a movable carrier 107 that needs to be placed back for storage, an activity level of the movable carrier 107 according to at least one selected from a goods handling frequency and a goods access quantity of goods stored on the movable carrier 107. In this way, a storage position when the movable carrier 107 returns to the stereoscopic warehouse 106 is determined according to a rank of the activity level of the movable carrier 107.

Specifically, the control center 100 may first determine, for a movable carrier 107 that needs to be placed back for storage, an activity level of the movable carrier 107 according to at least one selected from a goods handling frequency and a goods access quantity of goods stored on the movable carrier 107, and store the activity level. Then each movable carrier 107 is ranked according to the activity level of each movable carrier 107 that has been stored, to determine a rank of the movable carrier 107. Finally, a storage position for placing the movable carrier 107 is determined from idle goods positions on each floor according to the rank of the movable carrier 107.

The second conveying apparatus 104 does not need to travel along a rail, so that the flexibility of the second conveying apparatus is higher than that of the first conveying apparatus 102. In addition, the workstation is generally arranged on the bottom floor, so that less time is required for delivering or picking up goods in a bottom floor storage position, and few time is consumed for a conveying task. In addition, a higher floor indicates longer time required for transportation by the lifting apparatus 108. Therefore, the control center 100 may place, for different floors, a movable carrier 107 with a high activity level in a bottom floor storage position, and place a movable carrier 107 with a low activity level in a high floor storage position. Since quantities of storage positions on different floors are inconsistent, a rank range of each movable carrier 107 placed on each floor may be determined according to a quantity of storage positions on each floor.

For example, it is assumed that 100 storage positions are provided on the bottom floor of the stereoscopic warehouse 106, and 50 storage positions and 30 storage positions are respectively provided on the second floor and the third floor, movable carriers 107 that are ranked the top 100 may be placed in the bottom floor storage positions, movable carriers 107 that are ranked from 101 to 150 may be placed in high floor storage positions on the second floor in the high floors, and so on.

Further, since operations such as picking up and delivery on goods need to be performed in a workstation (the workstation is provided with the container handling apparatus 105), a closer distance from the workstation when a movable carrier 107 is placed on the bottom floor indicates less time consumed by an operation on goods stored on the movable carrier 107. Similarly, for movable carriers 107 placed on the same high floor, a closer distance between a movable carrier 107 and a high floor connection point 112 at the lifting apparatus 108 indicates less time consumed by an operation on goods stored on the movable carrier 107.

Therefore, in one or more embodiments of this specification, after a floor on which the movable carrier 107 is placed is determined, the control center 100 may determine, if the floor is the bottom floor and according to storage positions on the floor and a position of the workstation, to place a movable carrier 107 with a high activity level in a storage position close to the workstation, and place a movable carrier 107 with a low activity level in a storage position away from the workstation. If the floor is a high floor, the control center may determine, according to storage positions on the floor and a position of the high floor connection point 112, to place a movable carrier 107 with a high activity level in a storage position close to the high floor connection point 112, and place a movable carrier 107 with a low activity level in a storage position away from the high floor connection point 112.

For the high floor, a movable carrier 107 with a high activity level may alternatively be placed in a storage position close to a lifting apparatus 108 on the floor, that is, the high floor connection point 112 is replaced with the lifting apparatus 108. Alternatively, the high floor connection point 112 and the lifting apparatus 108 may be considered simultaneously.

Specifically, when the storage position in which the movable carrier 107 is stored is determined, the control server 100 may first determine, from each floor including idle storage positions, a floor on which the movable carrier 107 is placed according to the rank of the activity level of the movable carrier 107. The storage position in which the movable carrier 107 is stored is then determined from the idle storage positions on the determined floor and according to the rank of the activity level of the movable carrier 107.

It should be noted that, since a plurality of workstations may be arranged on the bottom floor of the stereoscopic warehouse 106, a plurality of high floor connection points 112 may be provided on or a plurality of lifting apparatuses 108 may be connected to each high floor. Therefore, the control server 100 may determine, according to positions of the plurality of workstations, the plurality of high floor connection points 112, or the plurality of lifting apparatuses 108, "popularity" of different storage positions on each floor, where a movable carrier 107 placed in a more "popular" storage position has a higher activity level rank. Certainly, for the case that a plurality of workstations/high floor connection points 112/lifting apparatuses 108 exist, the popularity of a storage position may be determined based on distance between the storage position and the plurality of workstations/high floor connection points 112/lifting apparatuses 108.

For example, for the bottom floor, the control server 100 may determine popularity distribution corresponding to each workstation according to Gaussian distribution with a preset parameter, where the popularity distribution covers at least some of bottom floor storage positions on the bottom floor, and the popularity distribution corresponding to each workstation is then superimposed, to determine the popularity of each bottom floor storage position.

Further, since it is determined that another movable carrier 107 may have been placed on a storage position according to the popularity, the control server 100 may determine whether the determined storage position is idle, and if the storage position is idle, call at least one selected from the first conveying apparatus 102, the second conveying apparatus 104, and the lifting apparatus 108 to place the movable carrier 107 in the storage position; or otherwise, exchange positions of the movable carrier 107 and the another movable carrier 107 that has been placed in the storage position, that is, take out the another movable carrier 107 from the storage position, and place the movable carrier 107 in the storage position. For the another movable carrier 107 that is taken out, the server may redetermine a storage position for the movable carrier 107 in the same manner.

Alternatively, in one or more embodiments of this specification, when the control server 100 determines that the storage position is not idle, the control server may further determine an idle storage position that is closest to the storage position, and place the movable carrier 107 in the redetermined idle storage position.

Alternatively, after the another movable carrier 107 is taken out from the storage position, the another movable carrier is placed in another idle storage position that is closest to the storage position.

Certainly, in this specification, there is no binding relationship between containers and movable carriers 107, so that a container storing goods may be placed in different movable carriers 107. A container may be taken out from a movable carrier 107 before picking up, and the container may be placed in another movable carrier 107 after picking up. Therefore, the control server 100 may further determine activity levels of different containers according to at least one selected from a goods handling frequency and a goods access quantity, and send, according to a rank of the activity level of each container, a conveying instruction for executing a conveying task to the first conveying apparatus 102, the second conveying apparatus 104, and the lifting apparatus 108 respectively, to adjust at least some of containers in the movable carriers 107, so that an activity level of a container in a movable carrier 107 in a bottom floor storage position is higher than an activity level of a container in a movable carrier 107 in a high floor storage position. Certainly, the foregoing process may be performed in a container picking up process, or may be performed in another task process. The container may be adjusted as long as the container needs to be taken out from the movable carrier 107.

In one or more embodiments of this specification, the control server 100 may further determine, according to an activity level of each container in a movable carrier 107, an activity level of the movable carrier 107, and place the movable carrier 107 back to a storage position by using any method of determining a storage position based on the rank of the activity level of the movable carrier 107. A specific process is similar to the foregoing process, and details are not described in this specification again.

In an existing warehouse, a tallying task is further included in addition to tasks such as picking up and delivery, namely, goods in at least two storage positions are sorted, and content such as goods combination and goods exchange may be included. In this specification, the tallying task may be performed in the workstation, and the control server 100 may further schedule, in response to the tallying task, at least one selected from the first conveying apparatus 102, the second conveying apparatus 104, and the lifting apparatus 108 to adjust the movable carrier 107 from an original storage position in the stereoscopic warehouse 10 to another storage position in the stereoscopic warehouse 106 or keep the movable carrier 107 remaining at the original storage position.

Specifically, the control server 100 determines, in response to the tallying task, a movable carrier 107 that completes tallying in the workstation, determines an original storage position of the movable carrier 107, and calls at least one selected from the first conveying apparatus 102, the second conveying apparatus 104, and the lifting apparatus 108 to place the movable carrier 107 back to the original storage position. Alternatively, the control server determines a rank of an activity level of the movable carrier 107 after tallying, determines another storage position to which the movable carrier 107 is placed back, and calls at least one selected from the first conveying apparatus 102, the second conveying apparatus 104, and the lifting apparatus 108 to place the movable carrier 107 in the another storage position.

Specifically, a method for determining the activity level of the movable carrier 107 is the same as the foregoing manner, that is, the activity level of the movable carrier 107 is determined according to at least one selected from a goods handling frequency and a goods access quantity of goods stored on the movable carrier 107. Subsequently, a storage position with an adjusted position of the movable carrier 107 during tallying may be determined according to the rank of the activity level of the movable carrier 107.

In addition, in one or more embodiments of this specification, a tallying task may be executed for one movable carrier 107. For example, when the movable carrier 107 is configured to place a plurality of containers, tallying may be performed on goods in at least two containers in the movable carrier 107. Alternatively, when the movable carrier 107 is configured to place one container, the workstation may also perform, according to goods stored in the workstation, tallying on goods in the container placed in the movable carrier 107.

Therefore, when the control server 100 calls, according to the tallying task, at least one selected from the first conveying apparatus 102, the second conveying apparatus 104, and the lifting apparatus 108, to convey the movable carrier 107 to the workstation for tallying, the control server may determine a storage position in which the movable carrier 107 is placed after the movable carrier returns to the stereoscopic warehouse 106. That is, the tallying task may include sorting goods corresponding to at least one movable carrier 107 and adjusting a storage position of the movable carrier 107. That is, a tallying task may be determined once at least one selected from goods adjustment and storage position adjustment is included. That is, the tallying task may be completed by changing the storage position of the movable carrier 107, or the tallying task may be completed by sorting the goods in the movable carrier 107, or the tallying task may be completed by sorting the goods in the movable carrier 107 and adjusting the storage position of the movable carrier 107.

Certainly, a manner for adjusting the storage position of the movable carrier 107 has been described in detail above, reference may be made to the foregoing content, and details are not described in this specification again.

In an embodiment of this specification, a process that the stereoscopic warehouse scheduling system executes a conveying task is described by using a process of conveying a movable carrier 107 from any high floor storage position to the bottom floor for goods delivery as an example.

When the control server 100 of the stereoscopic warehouse scheduling system determines, according to a conveying task to be executed, that goods in a movable carrier 107 in a high floor storage position needs to be conveyed to the bottom floor for delivery, the control server may determine first conveying apparatuses 102 on a floor on which the high floor storage position is located.

The control server then determines, from the determined first conveying apparatuses 102, a first conveying apparatus 102 for executing the conveying task, and sends a conveying instruction. The control server 100 may determine the first conveying apparatus 102 for executing the conveying task from the first conveying apparatuses 102 according to whether the first conveying apparatuses 102 are idle or a quantity of conveying instructions to be executed.

Certainly, a policy used for selecting the first conveying apparatus 102 is not limited in this application and may specifically be set as required. For example, the control server 100 may simply select any first conveying apparatus 102 from the idle first conveying apparatuses 102 as the first conveying apparatus 102 for executing the conveying task. Alternatively, further, a first conveying apparatus 102 that is closest to the high floor storage position in which the movable carrier 107 of this conveying task is located is determined from the idle first conveying apparatuses 102 as the first conveying apparatus 102 for executing the conveying task.

In addition, when the control server 100 sends the conveying instruction to the first conveying apparatus 102, the control server may further send a conveying instruction to the lifting apparatus 108 asynchronously, so that the lifting apparatus 108 ascends or descends to the floor (that is, a specified floor) on which the high floor storage position is located, namely, the floor on which the movable carrier 107 of the conveying task is located. The lifting apparatus 108 may move to the floor according to the conveying instruction, wait for the first conveying apparatus 102 to convey the movable carrier 107 to the high floor connection point 112, and receive the movable carrier 107 through the high floor connection point 112. It should be noted that, in this specification, conveying instructions sent by the control server 100 to different conveying apparatuses may not be completely the same.

The first conveying apparatus 102 then travels, according to the received conveying instruction, to the bottom of the high floor storage position in which the movable carrier 107 of this conveying task is located through an aisle on the floor, conveys out the movable carrier 107 from the high floor storage position in a piggyback manner, and travels to the high floor connection point 112 of the floor through the aisle on the floor again to place the movable carrier 107 in the lifting apparatus 108 through the high floor connection point 112. After the movable carrier is placed, the first conveying apparatus sends information that the conveying instruction is completed to the control server 100.

It should be noted that, the conveying instruction sent to the first conveying apparatus 102 includes an identifier of the high floor storage position in which the movable carrier 107 that needs to be conveyed is located, an identifier of the high floor connection point 112, and a path from the high floor storage position to the high floor connection point 112. When the stereoscopic warehouse 106 includes a plurality of high floor connection points 112, the control server 100 may determine the identifier of the high floor connection point 112 and the path through path optimization, and send the identifier and the path to the first conveying apparatus 102 as information included in the first conveying instruction. Therefore, the first conveying apparatus 102 conveys the movable carrier 107 to the high floor connection point 112 according to an optimized path.

The control server 100 determines, according to the information that the conveying instruction is completed sent by the first conveying apparatus 102, that the lifting apparatus 108 has taken out the movable carrier 107 through the high floor connection point 112, and sends a conveying instruction to the lifting apparatus 108 according to the conveying task corresponding to the movable carrier 107 that is currently conveyed, where the conveying instruction includes a specified floor that the lifting apparatus 108 needs to reach next, and the specified floor is the bottom floor in this example.

The lifting apparatus 108 may determine, according to the conveying instruction resent by the control server 100, to convey the movable carrier 107 that is currently conveyed to the bottom floor of the stereoscopic warehouse 106, and send information that the conveying instruction is completed to the control server 100.

The control server 100 determines that the movable carrier 107 has been conveyed to the bottom floor according to the information that the conveying instruction is completed sent by the lifting apparatus 108. The control server then determines a second conveying apparatus 104 for executing the conveying task from the second conveying apparatuses 104, and send a conveying instruction to the determined second conveying apparatus 104. The logic of determining the second conveying apparatus 104 for executing the conveying task from the second conveying apparatuses 104 may be the same as the logic of determining the first conveying apparatus 102 for executing the conveying task from the first conveying apparatuses 102, and details are not described in this specification again.

The second conveying apparatus 104 travels to the lifting apparatus 108 through an aisle on the bottom floor according to the conveying instruction sent by the control server 100, and conveys the movable carrier 107 conveyed by the lifting apparatus 108. The second conveying apparatus then travels to a corresponding bottom floor storage position through the aisle on the bottom floor, places the movable carrier 107 in the bottom floor storage position, and sends information that the conveying instruction is completed to the control server 100.

The control server 100 finally may determine that the conveying task is completed according to the execution completion information sent by the second conveying apparatus 104.

Alternatively, if goods need to be picked up and delivered at the picking station, after conveying the movable carrier 107 conveyed by the lifting apparatus 108, the second conveying apparatus 104 may convey the movable carrier 107 to the container handling apparatus 105, and send information that the conveying instruction is completed to the control server 100.

The container handling apparatus 105 then takes out, according to an operation instruction sent by the control server 100, a container storing goods that need to be picked up from the movable carrier 107, to pick up the goods stored in the container in the movable carrier 107 through the picking station. The container handling apparatus 105 may send information that the operation instruction is completed to the control server 100.

In addition, in this specification, a cargo carrier may be further provided on the high floor, at least some of floors in the high floors are further provided with the container handling apparatus 105, and the high floor connection points 112 are respectively provided near the container handling apparatus 105 on the high floor and in the lifting apparatus 108. The first conveying apparatus 102 is further configured to convey the movable carrier 107 between the high floor storage position and the high floor connection point 112 that is near the container handling apparatus 105, or convey the cargo carrier between the high floor connection point 112 that is near the container handling apparatus 105 and the high floor connection point 112 in the lifting apparatus 108. The container handling apparatus 105 is further configured to take out a container from the movable carrier 107 and place the container in the cargo carrier, or take out a container from the cargo carrier and place the container in the movable carrier 107.

It should be noted that, a form of the cargo carrier is not limited in this specification. The cargo carrier may include forms such as a rack (for example, a partition rack, a cargo box rack, or the like), a tray bracket, a cage trolley, and a pallet bracket, and a specific form of the cargo carrier may be set as required.

In this specification, the bottom floor of the stereoscopic warehouse 106 is provided with at least one bottom floor connection point. The second conveying apparatus 104 is further configured to convey, according to the conveying instruction sent by the control server 100, the movable carrier 107 indicated by the conveying instruction between the bottom floor storage position and the bottom floor connection point or between the lifting apparatus 108 and the bottom floor connection point. The bottom floor connection point of the stereoscopic warehouse 106 is a connection point connected to the outside of the stereoscopic warehouse 106. For example, a forklift or another conveying apparatus may take out a movable carrier 107 that needs to be delivered from the bottom floor connection point or may take out a container storing goods from the movable carrier 107, or may convey a movable carrier 107 that needs to be warehoused or a container storing goods to the bottom floor connection point, and at least one selected from the first conveying apparatus 102, the second conveying apparatus 104, and the lifting apparatus 108 then conveys, according to the conveying instruction sent by the control center 100, the movable carrier 107 to a bottom floor storage position or a high floor storage position from the bottom floor connection point.

In this specification, a specified area (for example, a picking area or a packaging area) on the bottom floor of the stereoscopic warehouse 106 may be provided with at least one bottom floor connection point, that is, the bottom floor connection point may alternatively be a specified area on the bottom floor. The second conveying apparatus 104 is configured to: take out the movable carrier 107 from the bottom floor storage position or the lifting apparatus 108, convey the movable carrier 107 to the bottom floor connection point, and place the movable carrier in the specified area; or take out the movable carrier 107 from the bottom floor connection point in the specified area, and convey the movable carrier 107 to the bottom floor storage position or the lifting apparatus 108.

In another embodiment of this specification, a process of delivering goods when a movable carrier 107 storing the goods that need to be delivered is located in a bottom floor storage position is used as an example, the control server 100 may determine a second conveying apparatus 104 for executing the conveying task from second conveying apparatuses 104, and send a conveying instruction to the determined second conveying apparatus 104.

The second conveying apparatus 104 travels, according to the received conveying instruction, to the bottom floor storage position through an aisle on the bottom floor, and conveys the movable carrier 107 stored in the bottom floor storage position.

The second conveying apparatus 104 then travels to the bottom floor connection point through the aisle on the bottom floor again to place the movable carrier 107 at the bottom floor connection point, and sends information that the conveying instruction is completed to the control server 100.

The control server 100 finally determines, after receiving the information that the conveying instruction is completed sent by the second conveying apparatus 104, that the movable carrier 107 is correctly conveyed to the bottom floor connection point and the conveying task is completed.

In an embodiment, a process that the stereoscopic warehouse scheduling system executes a conveying task is described by using a process of conveying a movable carrier 107 from the bottom floor connection point to any high floor storage position for warehousing as an example.

The control server 100 of the system may first determine, according to a conveying task to be executed and when determining that a movable carrier 107 that has been transported to the bottom floor connection point 110 needs to be conveyed to a high floor storage position for warehousing, a second conveying apparatus 104 for executing the conveying task from second conveying apparatuses 104, and send a conveying instruction to the determined second conveying apparatus 104. Certainly, the logic of determining the second conveying apparatus 104 for executing the conveying task is not described in this specification again.

The second conveying apparatus 104 then travels, according to the received conveying instruction, to the corresponding bottom floor connection point through an aisle on the bottom floor to convey the movable carrier 107, and travels to the lifting apparatus 108 through the aisle on the bottom floor again to place the movable carrier 107 in the lifting apparatus 108. After the movable carrier is placed, the second conveying apparatus sends information that the conveying instruction is completed to the control server 100.

In addition, when the control server 100 sends the conveying instruction to the second conveying apparatus 104, the control server may further send a conveying instruction to the lifting apparatus 108 asynchronously, so that the lifting apparatus 108 moves to the bottom floor (that is, a specified floor), namely, a floor on which a storage position corresponding to the movable carrier 107 that needs to be conveyed is located. The lifting apparatus 108 may move to the bottom floor according to the conveying instruction, and wait for the second conveying apparatus 104 to convey the movable carrier 107 to the lifting apparatus 108.

After receiving the information that the conveying instruction is completed sent by the second conveying apparatus 104, the control server 100 may continue to send a conveying instruction to the lifting apparatus 108 according to the information that the conveying instruction is completed and a floor on which a high floor storage position in which goods included in the conveying task need to be stored is located, where a specified floor corresponding to the conveying instruction is the floor on which the high floor storage position in which the goods need to be stored is located.

The lifting apparatus 108 conveys, according to the received conveying instruction sent by the control server 100 again, the movable carrier 107 to the floor on which the high floor storage position is located, and sends information that the conveying instruction is completed to the control server 100. In addition, when reaching the specified floor, the lifting apparatus 108 may further convey the movable carrier 107 out of the lifting apparatus 108 through a high floor connection point 112.

The control server 100 determines, according to the information that the conveying instruction is completed sent by the lifting apparatus 108, a first conveying apparatus 102 for executing the conveying task from first conveying apparatuses 102 on the floor on which the high floor storage position is located, and sends a conveying instruction to the determined first conveying apparatus 102.

The first conveying apparatus 102 travels, according to the received conveying instruction, the high floor connection point 112 through an aisle on the floor to convey the movable carrier 107 lifted by the lifting apparatus 108 from the bottom floor, and travels to the bottom of the high floor storage position through the aisle on the floor again to place the movable carrier 107 in the high floor storage position.

The first conveying apparatus 102 finally may send information that the conveying instruction is completed to the control server 100 after the movable carrier 107 is placed, and after receiving the information that the conveying instruction is completed sent by the first conveying apparatus 102, the control server 100 determines that the movable carrier 107 is correctly transported to the high floor storage position and the conveying task is completed.

In this specification, no matter in a warehousing process from a bottom floor connection point to a bottom floor storage position, a warehousing process from a bottom floor connection point to a high floor storage position, a delivery process from a high floor storage position to a bottom floor connection point, or a delivery process from a bottom floor storage position to a bottom floor connection point, the second conveying apparatus 104 may convey the movable carrier 107 to a position of the container handling apparatus 105 as long as a requirement for picking up goods stored in a container exists, and the container handling apparatus 105 takes out a container from the movable carrier 107 or places a container in the movable carrier 107.

Further, in this specification, the first conveying apparatus 102 may convey out the movable carrier 107 from or place the movable carrier 107 in the high floor storage position in a plurality of manners.

Specifically, the control server 100 determines, according to a conveying task, a high floor storage position corresponding to the conveying task. For example, a high floor storage position when the movable carrier 107 is warehoused may be considered as the high floor storage position corresponding to the conveying task, or a high floor storage position when the movable carrier 107 is warehoused for storage may also be considered as the high floor storage position corresponding to the conveying task.

The control server 100 then may send, according to the high floor storage position and an aisle position adjacent to the high floor storage position, a conveying instruction to the determined first conveying apparatus 102.

Figure 7B:
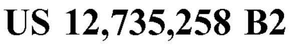
FIG. 7*b* is a schematic diagram of a first conveying apparatus taking out or placing a movable carrier from a side according to an embodiment of this specification.
Figure 7B:
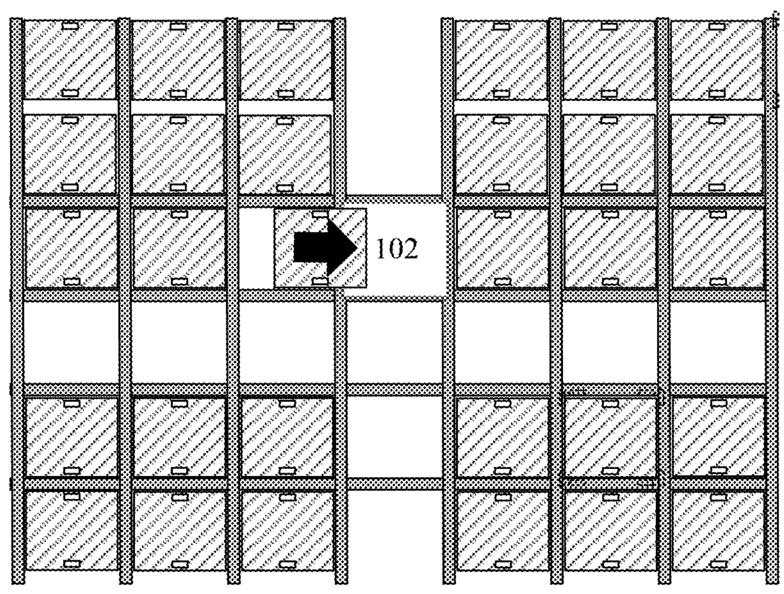

The first conveying apparatus 102 may take out, according to the conveying instruction sent by the control center 100, the movable carrier 107 from a side of the high floor storage position at an aisle position adjacent to the high floor storage position to the first conveying apparatus 102, or place the movable carrier 107 conveyed on the first conveying apparatus 102 in the high floor storage position from a side of the high floor storage position, as shown in FIG. 7*b*. FIG. 7*b* is a schematic diagram of a first conveying apparatus taking out or placing a movable carrier from a side according to this specification. It can be seen that, the first conveying apparatus 102 is located at an aisle position adjacent to a high floor storage position and takes out or places a container storing goods from a side of the high floor storage position.

Alternatively, after determining the high floor storage position corresponding to the conveying task, the control server 100 sends, according to the high floor storage position and another high floor storage position located above the high floor storage position, a conveying instruction to the determined first conveying apparatus 102.

The first conveying apparatus 102 may take out, according to the conveying instruction sent by the control server 100, the movable carrier 107 from the above of the high floor storage position to the first conveying apparatus 102, or place the movable carrier 107 from the first conveying apparatus 102 in the high floor storage position from the above of the high floor storage position.

Further, in this specification, the second conveying apparatus 104 may also convey out the movable carrier 107 from or place the movable carrier 107 in the bottom floor storage position in a plurality of manners.

Specifically, the control server 100 determines, according to a conveying task, a bottom floor storage position corresponding to the conveying task. For example, a bottom floor storage position when the movable carrier 107 is warehoused may be considered as the bottom floor storage position corresponding to the conveying task, or a bottom floor storage position when the movable carrier 107 is warehoused for storage may also be considered as the bottom floor storage position corresponding to the conveying task.

The control server 100 then may send, according to the bottom floor storage position and an aisle position adjacent to the bottom floor storage position, a conveying instruction to the determined second conveying apparatus 104.

The second conveying apparatus 104 may take out, according to the conveying instruction sent by the control server 100, the movable carrier 107 from a side of the bottom floor storage position at the aisle position adjacent to the bottom floor storage position to the second conveying apparatus 104, or place the movable carrier 107 conveyed on the second conveying apparatus 104 in the bottom floor storage position from a side of the bottom floor storage position.

Alternatively, after determining the bottom floor storage position corresponding to the conveying task, the control server 100 sends, according to the bottom floor storage position, a conveying instruction to the determined second conveying apparatus 104.

The second conveying apparatus 104 may enter, according to the conveying instruction sent by the control server 100, the bottom of the bottom floor storage position from an aisle position adjacent to the bottom floor storage position, to take out the movable carrier 107 from the bottom of the bottom floor storage position onto the second conveying apparatus 104, or place the movable carrier 107 indicated by the conveying instruction from the second conveying apparatus 104 in the bottom floor storage position.

In addition, in this specification, for each stereoscopic warehouse 106, the stereoscopic warehouse 106 may be internally provided with at least one lifting apparatus 108. Therefore, to place the movable carrier 107 on any floor of the stereoscopic warehouse 106, when the stereoscopic warehouse 106 includes a plurality of lifting apparatuses 108, specified floors reachable by the plurality of lifting apparatuses 108 are at least overlapped.

Figure 8:
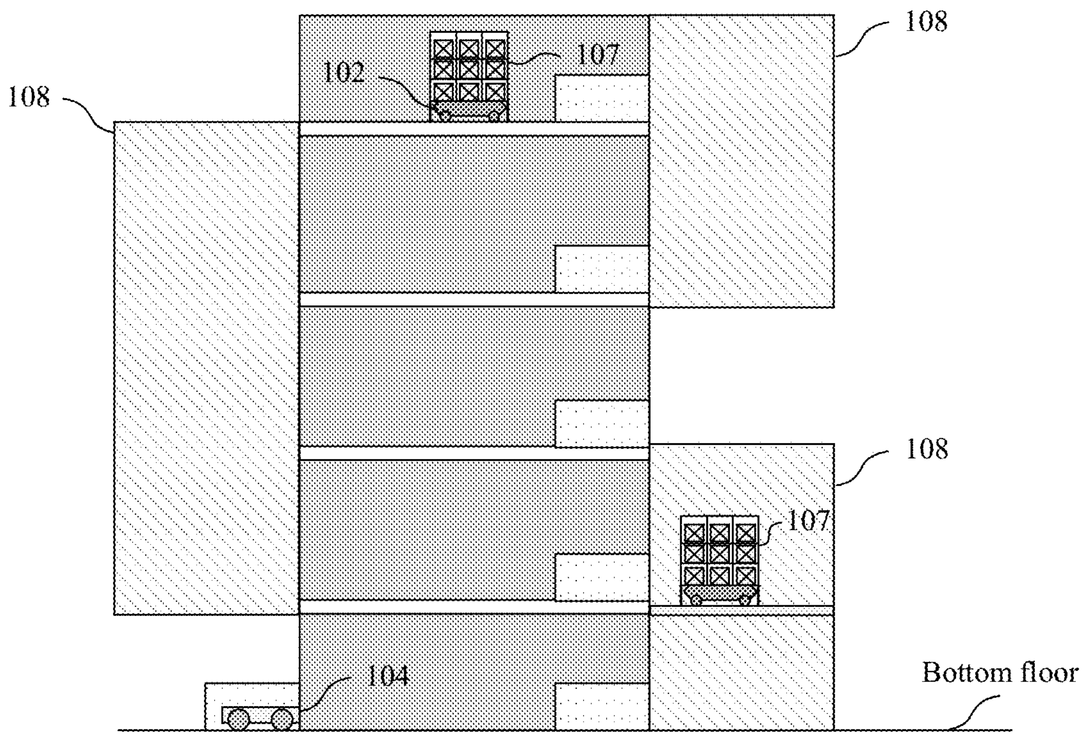
FIG. 8 is a schematic diagram of distribution of lifting apparatuses according to an embodiment of this specification.

That is, the lifting apparatuses 108 can connect the floors in the stereoscopic warehouse 106 through the overlapped floors. As shown in FIG. 8, the stereoscopic warehouse 106 includes four floors and three lifting apparatuses 108 which respectively connect the bottom floor and the first floor, the first floor and the second floor, and the second floor and the third floor. Certainly, the lifting apparatuses 108 may be located at different positions in the stereoscopic warehouse 106.

The control server 100 may transport the movable carrier 107 to any floor in the stereoscopic warehouse 106 through one or more lifting apparatuses 108. For example, in FIG. 8, if the control server intends to transport goods on the third floor to the bottom floor, the server may respectively call first conveying apparatuses 102 on the first floor to the third floor and corresponding lifting apparatuses 108, so that the lifting apparatuses 108 and the first conveying apparatus 102 on each floor transport the goods from the third floor to the bottom floor in a relay manner, and the second conveying apparatus 104 on the bottom floor may further convey the movable carrier 107.

Figure 9:
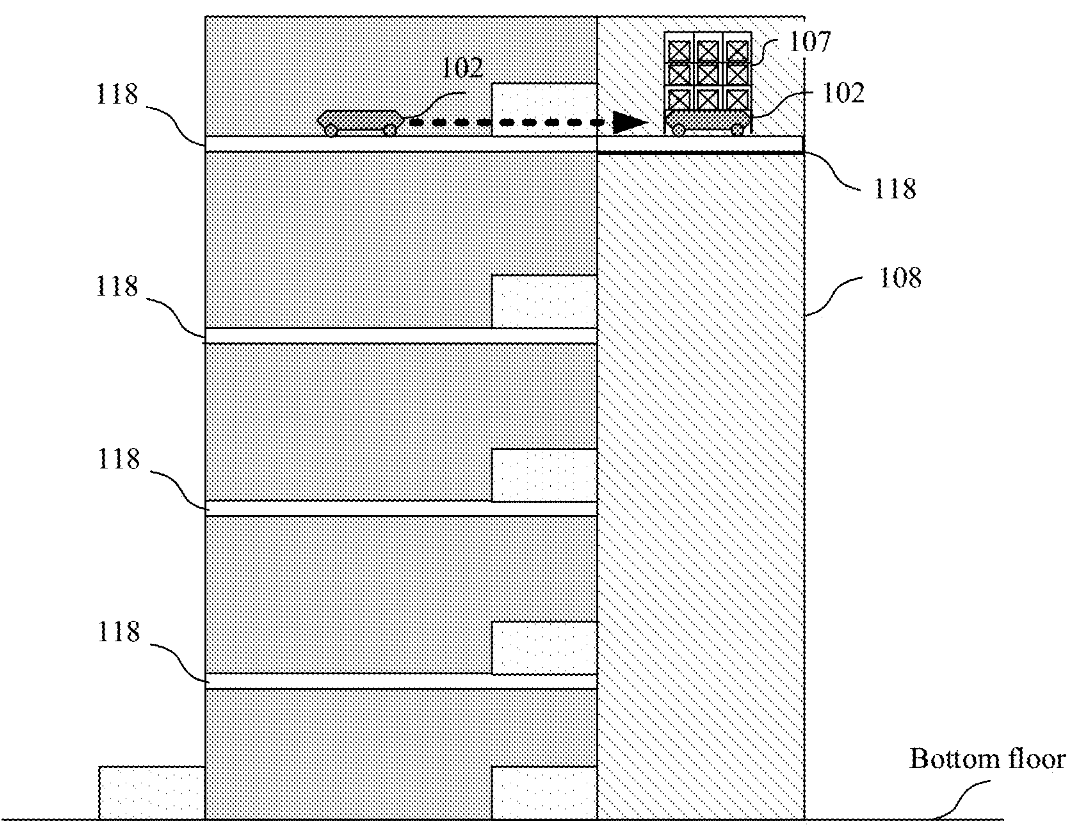
FIG. 9 is a schematic diagram of a lifting apparatus of a stereoscopic warehouse with a rail provided inside according to an embodiment of this specification.

In this specification, a rail 118 may be provided in the lifting apparatus 108, so that the rail 118 in the lifting apparatus 108 may be connected to the rail 118 provided on each high floor of the stereoscopic warehouse 106. When the first conveying apparatus 102 moves on the high floor along the rail 118, the first conveying apparatus may travel into the lifting apparatus 108 and directly place the movable carrier 107 in the lifting apparatus 108, or the first conveying apparatus 102 may be conveyed by the lifting apparatus 108 to another floor, as shown in FIG. 9. FIG. 8 and FIG. 9 are both presented by using an example in which the movable carrier 107 is configured to place a plurality of containers, and as described above in this specification, the movable carrier 107 may alternatively be a container configured to place one container.

Furthermore, in this specification, when the rail 118 is also provided in the lifting apparatus 108, the control server 100 may further call the first conveying apparatus 102 between floors through the lifting apparatus 108.

Specifically, in this specification, the control server 100 may determine, according to conveying tasks to be executed corresponding to some high floors or all the high floors, a quantity of first conveying apparatuses 102 required for each high floor. The control server 100 may use a floor on which a high floor storage position involved in each conveying task is located as a high floor corresponding to the conveying task. For example, a conveying task A needs to convey out a movable carrier 107 from the third floor, in this case, the third floor is the high floor corresponding to the conveying task A; or a conveying task B needs to convey a movable carrier 107 to a high floor storage position on the third floor, in this case, the third floor is the high floor corresponding to the conveying task B. In addition, the control server 100 may determine, according to a quantity of conveying tasks to be executed corresponding to each high floor, the quantity of first conveying apparatuses 102 required for each high floor, and a greater quantity of conveying tasks to be executed corresponding to a high floor indicates a greater quantity of first conveying apparatuses 102 required for the high floor. Certainly, space on each floor of the warehouse is limited, an excessively large quantity of first conveying apparatuses 102 may lead to a reduce in a quantity of paths that can be traveled by the apparatuses or path congestion. Therefore, in this specification, the control server 100 may further determine, according to a preset maximum quantity of first conveying apparatuses 102 on each high floor, the quantity of first conveying apparatuses 102 required for each high floor. The maximum quantity of the first conveying apparatuses 102 may differ as a layout of each floor differs, and a smaller quantity of movable carriers 107 arranged on each high floor indicates more areas that can be traveled by the first conveying apparatus 102.

The control server 100 then may determine, according to the quantity of first conveying apparatuses 102 required for each high floor and a current quantity of first conveying apparatuses 102 on each high floor, first conveying apparatuses 102 that need to be called by each high floor, and send a calling instruction to the first conveying apparatuses 102 that need to be called.

The first conveying apparatus 102 is further configured to travel into the lifting apparatus 108 along the rail 118 according to the received calling instruction sent by the control server 100, and reach a high floor specified by the calling instruction through the lifting apparatus 108.

In addition, in the description of the structure of the stereoscopic warehouse 106 in this specification, the high floor connection point 112 provided on each high floor is independent of the lifting apparatus 108. This is because if the first conveying apparatus 102 cannot reach the lifting apparatus 108, the high floor connection point 112 needs to convey the movable carrier 107 to the lifting apparatus 108, and the lifting apparatus 108 then conveys the movable carrier 107 to the specified floor.

If the rail 118 is also provided in the lifting apparatus 108, and the first conveying apparatus 102 may travel into the lifting apparatus 108, the high floor connection point 112 may also be provided in the lifting apparatus 108 in this specification.

The first conveying apparatus 102 is further configured to travel to the high floor connection point 112 in the lifting apparatus 108 according to the conveying instruction sent by the control server 100, and place the movable carrier 107 at the high floor connection point 112 or take out the movable carrier 107 from the high floor connection point 112.

In one or more embodiments of this specification, the high floor connection point 112 may alternatively be provided in the lifting apparatus 108. The first conveying apparatus 102 may be further configured to travel to the high floor connection point in the lifting apparatus 108, and place the movable carrier 107 at the high floor connection point 112 or take out the movable carrier 107 from the high floor connection point 112.

Figure 10:
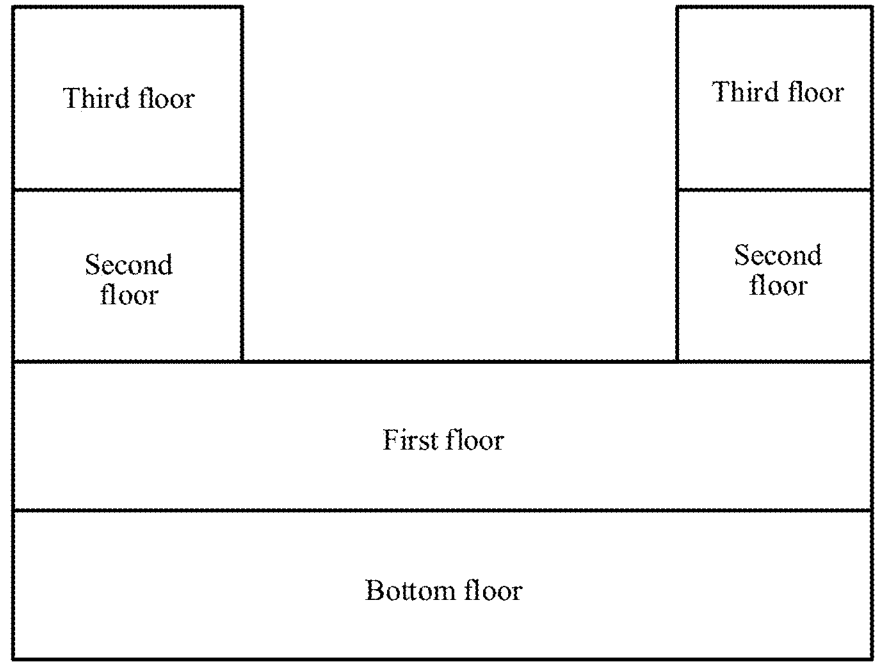
FIG. 10 is a schematic diagram of areas that are not in communication with each other of a stereoscopic warehouse according to an embodiment of this specification.

Further, in this specification, the warehouse may be affected by various aspects during construction, leading to a different layout of each floor. When the high floors of the stereoscopic warehouse 106 have a floor on which not all areas can be in communication with each other through a rail, as shown in FIG. 10, if a first conveying apparatus 102 needs to be called between two areas, the control server 100 may be configured to perform the following steps:

For a floor on which not all areas can be in communication with each other through a rail 118, when the first conveying apparatus 102 needs to be called between different areas on the floor, an area from which the first conveying apparatus 102 is called out is used as a departure area, an area to which the first conveying apparatus 102 is called is used as a destination area, and the control server 100 is configured to determine a floor on which all areas are in communication with each other through a rail that is closest to the floor as an intermediate floor.

The control server 100 sends a calling instruction to the first conveying apparatus 102 in the departure area, sends a conveying instruction to a lifting apparatus 108 connecting the intermediate floor and the departure area, and sends a conveying instruction to a lifting apparatus 108 connecting the intermediate floor and the destination area, so that the first conveying apparatus 102 reaches the destination area from the departure area through the two lifting apparatuses 108 and the rail 118 on the intermediate floor.

Figure 11A:
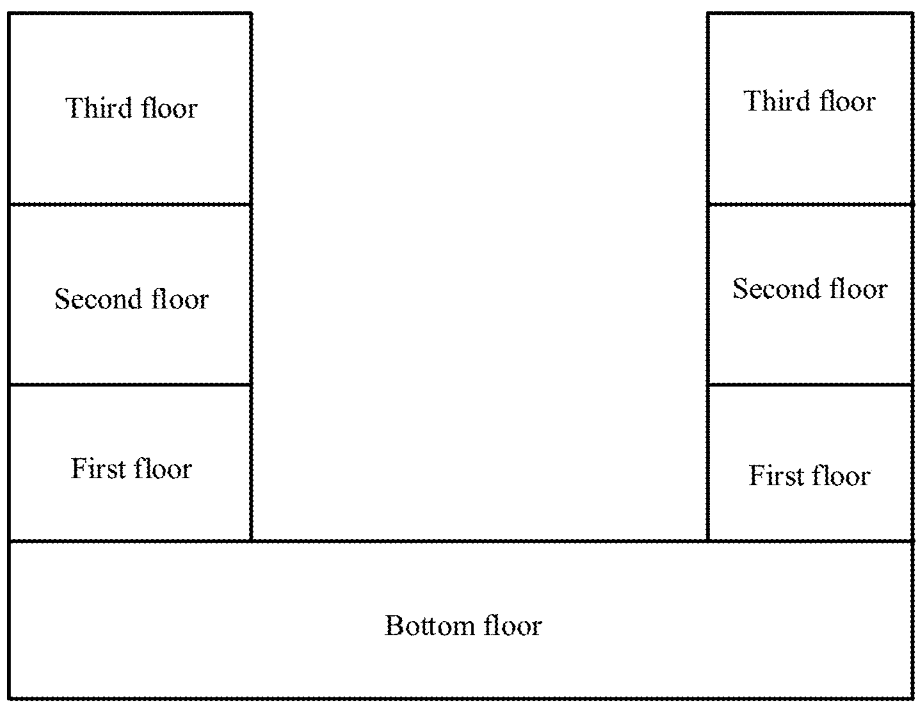
FIG. 11*a* and FIG. 11*b* are schematic diagrams of two stereoscopic warehouses that are in ground communication according to an embodiment of this specification.
Figure 11B:
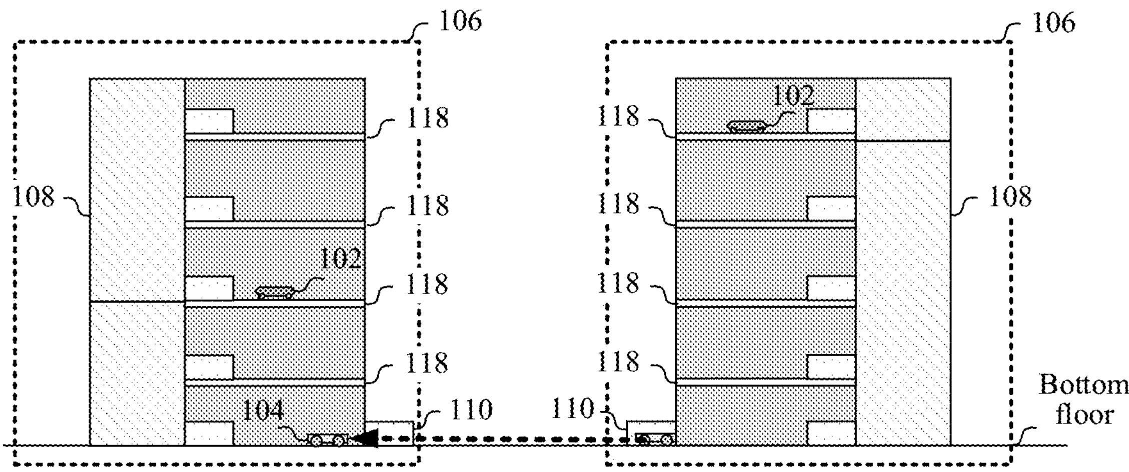

Further, in the system provided in this specification, when there exist two or more stereoscopic warehouses 106, bottom surfaces of the stereoscopic warehouses 106 are in communication with each other, as shown in FIG. 11*a* and FIG. 11*b*. FIG. 11*a* is a simple schematic diagram of grounds of two stereoscopic warehouses being in communication with each other corresponding to FIG. 10, which indicates that the two stereoscopic warehouses are in communication with each other through the bottom floors, so that the two stereoscopic warehouses may be considered as a whole. FIG. 11*b* is a detailed schematic diagram, and it can be seen that the two stereoscopic warehouses are independently arranged on the bottom surfaces. It can be seen from the figure that a bottom floor connection point 110 is provided on the bottom floor.

In addition, the control server 100 may determine, according to a conveying task to be executed corresponding to at least a part of each stereoscopic warehouse 106, a quantity of first conveying apparatuses 102 required for each stereoscopic warehouse 106;

determine, according to the quantity of first conveying apparatuses 102 required for each stereoscopic warehouse 106 and a current quantity of first conveying apparatuses 102 in each stereoscopic warehouse 106, first conveying apparatuses 102 that need to be called by each stereoscopic warehouse 106; and use a stereoscopic warehouse 106 from which the first conveying apparatuses 102 are called out as a departure warehouse, use a stereoscopic warehouse 106 to which the first conveying apparatuses 102 are called as a destination warehouse, send a calling instruction to the first conveying apparatuses 102 in the departure warehouse, and send a conveying instruction to the second conveying apparatus 104, the lifting apparatus 108 in the departure warehouse, and the lifting apparatus 108 in the destination warehouse, to cause the first conveying apparatuses 102 to be called from the departure warehouse to the destination warehouse through the two lifting apparatuses 108 and the second conveying apparatus 104.

The second conveying apparatus 104 is further configured to convey the first conveying apparatuses 102 from the bottom floor of the departure warehouse to the bottom floor of the destination warehouse.

It should be noted that, the first conveying apparatus 102 may travel into the lifting apparatus 108 through the rail 118, so that the second conveying apparatus 104 may consider the first conveying apparatus 102 in the lifting apparatus 108 as a carrier in the lifting apparatus 108, and convey the first conveying apparatus 102 out of the lifting apparatus 108 in the same manner of conveying the movable carrier 107. In addition, the bottom floors of the stereoscopic warehouses 106 are in communication with each other, the second conveying apparatus 104 may reach another stereoscopic warehouse 106 from one stereoscopic warehouse 106 through the bottom floors, so that the first conveying apparatus 102 is called between different stereoscopic warehouses 106.

In addition, in this specification, a transfer apparatus 120 with power is arranged in the lifting apparatus 108, and the high floor connection point 112 at least includes the transfer apparatus 120 located in the lifting apparatus. The transfer apparatus 120 with power may actively move a movable carrier 107 placed on the transfer apparatus 120. For example, the transfer apparatus may be a roller line, a transmission line, or a bidirectional telescopic fork, and a specific form of the transfer apparatus is not limited.

The first conveying apparatus 102 is further configured to travel to the transfer apparatus 120 serving as the high floor connection point 112 in the lifting apparatus 108, and place the movable carrier 107 on the transfer apparatus 120, or take out the movable carrier 107 from the transfer apparatus 120 serving as the high floor connection point 112.

Figure 12:
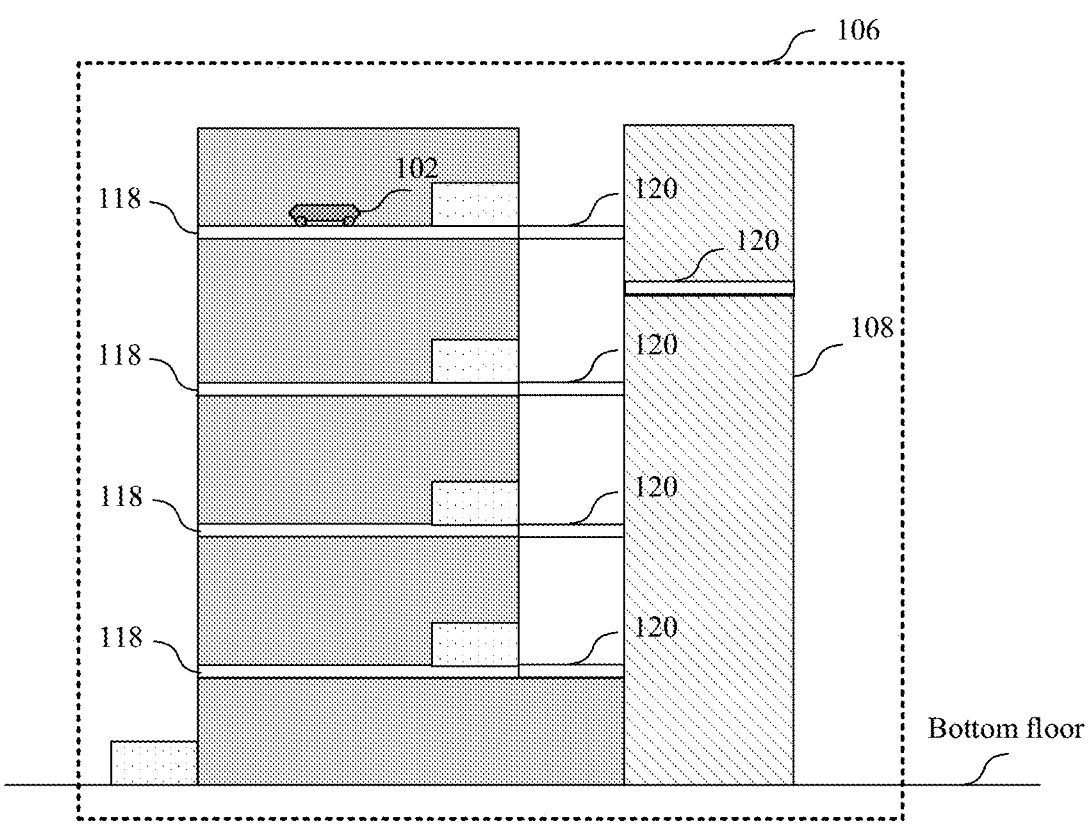
FIG. 12 is a schematic diagram of a transfer apparatus in a system according to an embodiment of this specification.

Further, in this specification, the transfer apparatus 120 with power is arranged outside a position of the lifting apparatus 108 connected to the high floor on at least some of the high floors in the stereoscopic warehouse 106. The high floor connection point in this specification further at least includes the transfer apparatus located outside the lifting apparatus, as shown in FIG. 12.

When the lifting apparatus 108 is located on a high floor, the transfer apparatus 120 located outside the lifting apparatus 108 is connected to the transfer apparatus 120 located in the lifting apparatus 108, and the movable carrier 107 may be transported from the transfer apparatus 120 located in the lifting apparatus 108 to the transfer apparatus 120 located outside the lifting apparatus 108, or the movable carrier 107 may be transported from the transfer apparatus 120 located outside the lifting apparatus 108 to the transfer apparatus 120 located in the lifting apparatus 108.

In addition, in this specification, when the transfer apparatus 120 is arranged in the lifting apparatus 108, the transfer apparatus 120 with power may also be arranged on the bottom floor of the stereoscopic warehouse 106, so that when the lifting apparatus 108 is located on the bottom floor, the transfer apparatus 120 on the bottom floor may be connected to the transfer apparatus 120 located in the lifting apparatus 108 and convey the movable carrier 107 from the transfer apparatus 120 located in the lifting apparatus 108 to the transfer apparatus 120 located on the bottom floor, the second conveying apparatus 104 may take out the movable carrier 107 from the transfer apparatus 120 located on the bottom floor, or the transfer apparatus 120 located on the bottom floor can transport, when the second conveying apparatus 104 places the movable carrier 107 on the transfer apparatus 120 located on the bottom floor, the movable carrier 107 from the transfer apparatus 120 located on the bottom floor to the transfer apparatus 120 located in the lifting apparatus 108.

Figure 13:
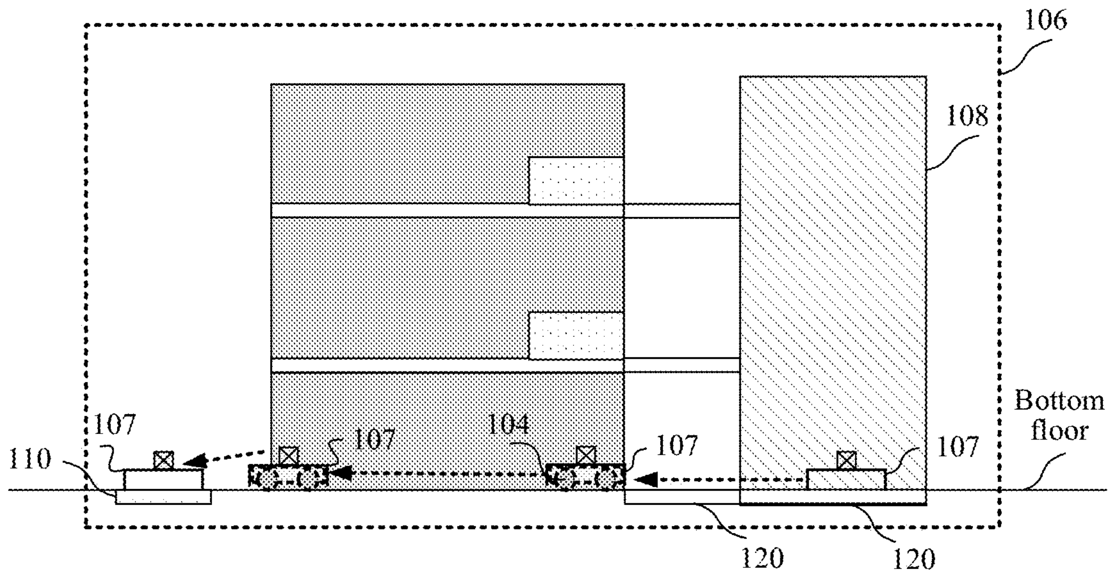
FIG. 13 is a schematic diagram of a connection point on a bottom floor in a system specified area according to an embodiment of this specification.

Therefore, in this specification, the second conveying apparatus 104 is further configured to take out the movable carrier 107 from the transfer apparatus 120 located on the bottom floor, convey the movable carrier 107 to the bottom floor connection point 110, and place the movable carrier 107 in the specified area. Alternatively, the second conveying apparatus 104 may take out the movable carrier 107 from the bottom floor connection point 110 in the specified area, and convey the movable carrier 107 to the transfer apparatus 120 located on the bottom floor. As shown in FIG. 13, a dashed line indicates a moving path of the movable carrier 107.

In another implementation of this specification, the control server 100 may send a conveying instruction of transporting the movable carrier to a specified area outside the stereoscopic warehouse 106 to the second conveying apparatus 104 as required, and the second conveying apparatus 104 may convey the movable carrier 107 to the specified area according to the conveying instruction. That is, in this specification, the second conveying apparatus 104 is not limited to only operate in the stereoscopic warehouse 106, since the second conveying apparatus 104 operates on a platform on the bottom floor, the second conveying apparatus may be connected to an apparatus located outside the system or the stereoscopic warehouse 106 without being limited by a rail, to convey out a movable carrier 107 out or convey in a movable carrier 107. The external apparatus may be a forklift controlled by an operator, a roller line conveying movable carriers 107, a production line, or an area for operators to pick up goods, which is not limited in this specification.

Further, the system may further include: at least one external temporary storage area 122. The external temporary storage area 122 is in at least one form selected from stereoscopic storage or planar storage, which is not limited in this specification. When the external temporary storage area 122 is in the form of stereoscopic storage, a lifting apparatus 108 may also be arranged in the external temporary storage area 122 to connect floors of the external temporary storage area 122. Certainly, if no lifting apparatus 108 is arranged in the external temporary storage area 122, a movable carrier 107 on a high floor of the external temporary storage area 122 may alternatively be conveyed by a stereoscopic conveying apparatus such as a forklift, and a layout structure of the external temporary storage area 122 may also be the form shown in FIG. 2, FIG. 4, FIG. 5*a*, or FIG. 5*b*.

In this specification, the external temporary storage area 122 and at least one stereoscopic warehouse 106 share at least some of the second conveying apparatuses 104, or the second conveying apparatus 104 conveys and/or connects to the movable carrier 107 between the external temporary storage area 122 and the at least one stereoscopic warehouse 106. For example, when goods stored in a movable carrier 107 in the stereoscopic warehouse 106 need to be conveyed to the external temporary storage area 122, the control server 100 may send a conveying instruction to the second conveying apparatus, and the second conveying apparatus 104 transports the movable carrier 107 to the external temporary storage area 122 for temporary storage.

The external temporary storage area 122 may be configured to store goods with a relatively high delivery and warehousing frequency, so that a delivery and warehousing frequency of goods in the stereoscopic warehouse 106 is reduced, and time of each conveying apparatus that is occupied for conveying goods with a relatively high warehousing frequency is reduced. Generally, the external temporary storage area 122 has a smaller storage capacity and a simpler structure relative to the stereoscopic warehouse 106, provided that goods temporary storage can be realized.

Based on the stereoscopic warehouse scheduling system shown in FIG. 2 and the description of the foregoing conveying task execution process, it can be seen that in the system provided in this specification, a first conveying apparatus and a second conveying apparatus are used in a stereoscopic warehouse in a combined manner, and a conveying function of a lifting apparatus in the stereoscopic warehouse is used, so that the first conveying apparatus and the second conveying apparatus can cooperate in a dense storage warehouse to convey a movable carrier; a container handling apparatus is arranged to take out goods from the movable carrier or place goods in the movable carrier, and a plurality of containers may be placed in the movable carrier, so that the utilization of storage space is improved; and the container handling apparatus is used to effectively store a container in the movable carrier or take out a container from the movable carrier, so that the sorting efficiency of the goods in the stereoscopic warehouse is improved, the warehouse operation costs are reduced, and the conveying efficiency is improved.

Figure 14:
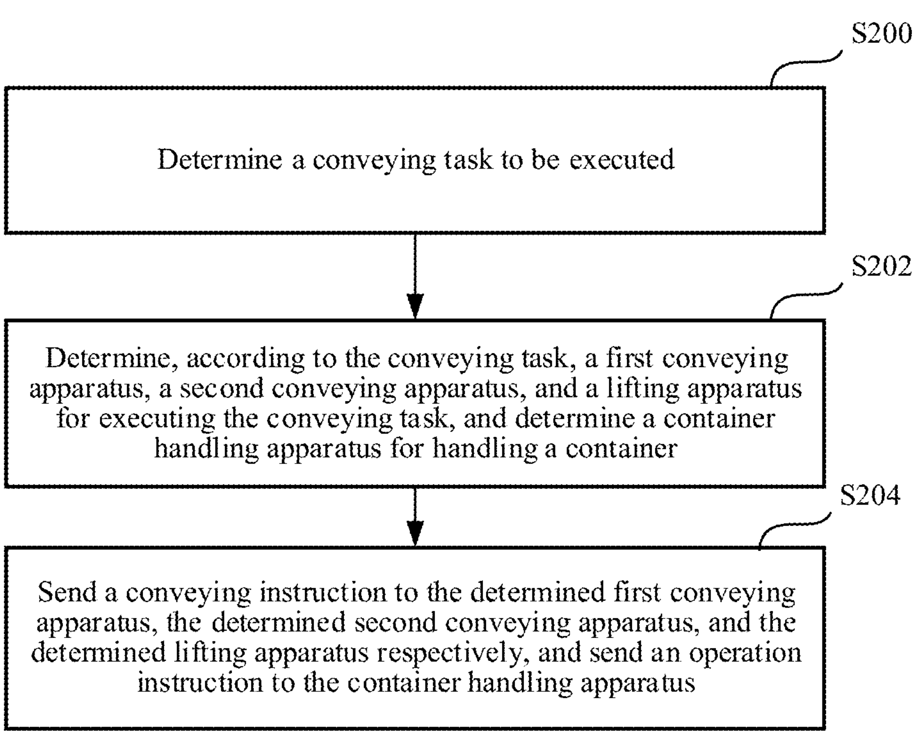
FIG. 14 is a schematic diagram of a stereoscopic warehouse scheduling procedure according to an embodiment of this specification.

Based on the system shown in FIG. 2, for ease of understanding an operation process of the system, this specification further provides a stereoscopic warehouse scheduling method, as shown in FIG. 14.

FIG. 14 is a schematic flowchart of a stereoscopic warehouse scheduling method according to this specification. There exists at least one or more stereoscopic warehouses, floors of the stereoscopic warehouse are in communication with each other through at least one lifting apparatus, the stereoscopic warehouse is provided with at least two floors, the floors of the stereoscopic warehouse are in communication with each other through at least one lifting apparatus, a bottom floor is provided with one or more container handling apparatuses, at least some of bottom floor storage positions on the bottom floor are provided with movable carriers, each floor in other high floors other than the bottom floor of the stereoscopic warehouse is provided with at least one high floor connection point, the high floors are respectively provided with rails for operation of a first conveying apparatus, at least some of high floor storage positions on the high floors are provided with movable carriers, and the stereoscopic warehouse scheduling process may specifically include the following steps:

S200. Determine a conveying task to be executed.

It should be noted that, the conveying task is a task used for causing a conveying apparatus to convey a movable carrier to implement goods sorting in the stereoscopic warehouse, and may be determined according to a received order.

In this specification, stereoscopic warehouse scheduling may be performed by a server. The server first determines a conveying task to be executed.

S202. Determine, according to the conveying task, a first conveying apparatus, a second conveying apparatus and a lifting apparatus for executing the conveying task, and determine a container handling apparatus for handling a container.

After the conveying task to be executed is determined, the server may determine, according to the conveying task, a first conveying apparatus, a second conveying apparatus and a lifting apparatus for executing the conveying task, and determine a container handling apparatus for handling a container.

S204. Send a conveying instruction to the determined first conveying apparatus, the determined second conveying apparatus, and the determined lifting apparatus respectively, and send an operation instruction to the container handling apparatus.

After the conveying apparatuses and the lifting apparatus are determined, the server may send a conveying instruction to the determined first conveying apparatus, the determined second conveying apparatus, and the determined lifting apparatus respectively, and send an operation instruction for goods in a movable carrier to the container handling apparatus.

The conveying instruction is used for causing the first conveying apparatus, the second conveying apparatus, and the lifting apparatus to cooperate to convey a movable carrier from a high floor storage position or a bottom floor storage position of the stereoscopic warehouse to the container handling apparatus arranged on the bottom floor, or convey a movable carrier from the container handling apparatus arranged on the bottom floor to a high floor storage position or a bottom floor storage position of the stereoscopic warehouse. The operation instruction is used for causing the container handling apparatus to take out a container from the movable carrier or place a container in the movable carrier.

The first conveying apparatus, the second conveying apparatus, and the lifting apparatus may cooperate to convey the movable carrier according to the conveying instruction. The container handling apparatus may take out a container from the movable carrier or place a container in the movable carrier according to the operation instruction.

The server may be one or more apparatuses, for example, a distributed server including a plurality of servers, which is not limited in this specification. Certainly, there may be one or more stereoscopic warehouses, one server may be set to determine conveying tasks of the plurality of stereoscopic warehouses and schedule apparatuses to execute the conveying tasks, or a plurality of servers may respectively determine different conveying tasks and schedule apparatuses to execute the conveying tasks. In addition, when there are a plurality of servers, the servers may share determined conveying tasks, so that the plurality of servers may cooperate to complete a plurality of conveying tasks.

In addition, for a detailed execution process of the method, reference may be made to the description of the process of executing a conveying task in the stereoscopic warehouse scheduling system, and details are not described in this specification again.

Based on the method shown in FIG. 14, by using the first conveying apparatus and the second conveying apparatus in the stereoscopic warehouse in a combined manner, and using the conveying function of the lifting apparatus in the stereoscopic warehouse, the first conveying apparatus and the second conveying apparatus can cooperate in a dense storage warehouse to convey goods, so that arrangement of rails on the bottom floor of the warehouse is avoided, and a warehouse layout can be flexibly changed. In addition, a quantity of required first conveying apparatuses may be reduced, thereby reducing the warehouse operation costs and improving the conveying efficiency.

In the 1990s, improvements in a technology can be clearly categorized as hardware improvements (for example, improvements to a circuit structure such as a diode, a transistor, a switch, or the like) and software improvements (improvements to a method procedure). However, with the development of technology, at present, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) (such as a field programmable gate array (FPGA)) is a type of integrated circuit whose logic function is determined by a user by programming the device. The designers perform voluntary programming to “integrate” a digital system into a single PLD without requiring a chip manufacturer to design and prepare a dedicated integrated circuit chip. Moreover, nowadays, instead of manually making integrated circuit chips, this programming is mostly implemented by using “logic compiler” software, which is similar to a software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, Cornell University programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller may be implemented in any suitable manner, for example, the controller can take the form of, for example, a microprocessor or processor and a computer-readable medium storing computer-readable program code (for example, software or firmware) executable by the processor (microprocessor), a logic gate, a switch, an application-specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The memory controller may also be implemented as a part of the memory control logic. A person skilled in the art also understands that, in addition to implementing the controller in the form of pure computer-readable program code, it is also possible to implement, by logically programming the method steps, the controller in the form of a logic gate, a switch, an ASIC, a programmable logic controller, and an embedded microcontroller and other forms to achieve the same function. Such a controller may therefore be considered as a hardware component and apparatuses included therein for implementing various functions may also be considered as structures inside the hardware component. Alternatively, apparatuses configured to implement various functions may be considered as both software modules implementing the method and structures inside the hardware component.

The system, the apparatus, the module or the unit described in the foregoing embodiments may specifically be implemented by a computer chip or an entity, or implemented by a product having a function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination selected from any one of these devices.

For ease of description, when the apparatus is described, the apparatus is divided into units according to functions, which are separately described. Certainly, in the implementation of this specification, the functions of the units may be implemented in the same piece of or a plurality of pieces of software and/or hardware.

A person skilled in the art should understand that the embodiments of the present invention may be provided as a method, a system, or a computer program product. Therefore, the present invention may use a form of hardware only embodiments, software only embodiments, or embodiments with a combination selected from software and hardware. In addition, the present invention may use a form of a computer program product implemented on one or more computer-usable storage media (including but not limited to a disk memory, a CD-ROM, an optical memory, and the like) including computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination selected from a process and/or a block in the flowcharts and/or the block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory may include a form such as a non-persistent memory, a random-access memory (RAM) and/or a non-volatile memory of computer readable media, for example, a read-only memory (ROM) or a flash memory (flashRAM). The memory is an example of a computer-readable medium.

The computer-readable medium includes a non-volatile medium and a volatile medium, a movable medium and a non-movable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette tape, a magnetic tape, a magnetic disk storage or another magnetic storage device, or any other non-transmission medium, which may be configured to store information accessible by a computing device. Based on the description in this specification, the computer-readable medium does not include transitory computer-readable media (transitory media), such as a modulated data signal and a carrier.

It should be further noted that, the term "include", "comprise", or any variant thereof is intended to cover non-exclusive inclusion. Therefore, a process, a method, an article, or a device that includes a series of elements not only includes such elements, but also includes other elements not listed clearly, or may include inherent elements of the process, the method, the article, or the device. Unless otherwise specified, an element limited by a sentence "including a/an . . . " does not exclude other same elements existing in the process, the method, the article, or the device that includes the element.

A person skilled in the art should understand that the embodiments of this specification may be provided as a method, a system, or a computer program product. Therefore, this specification may use a form of hardware only embodiments, software only embodiments, or embodiments with a combination selected from software and hardware. Moreover, this specification may use a form of a computer program product that is implemented on one or more computer-usable storage media (including but not limited to a disk memory, a CD-ROM, an optical memory, and the like) that include computer-usable program code.

This specification may be described in the general context of computer-executable instructions executed by a computer, for example, program modules. Generally, the program module includes a routine, a program, an object, a component, a data structure, and the like for executing a particular task or implementing a particular abstract data type. This specification may also be implemented in a distributed computing environment in which tasks are performed by remote processing devices connected by using a communication network. In a distributed computing environment, the program module may be located in both local and remote computer storage media including storage devices.

Each embodiment in this specification is described in a progressive manner, and the same or similar parts between the various embodiments may be referred to each other. Each embodiment focuses on the differences from other embodiments. Especially, a system embodiment is basically similar to a method embodiment, and therefore is described briefly; for related parts, reference may be made to partial descriptions in the method embodiment.

The descriptions are merely embodiments of this specification, and are not intended to limit this specification. For a person skilled in the art, various modifications and changes may be made to this specification. Any modification, equivalent replacement, and improvement made within the spirit and principle of this specification shall fall within the scope of the claims of this specification.

The present invention includes:

A1. A stereoscopic warehouse scheduling system, including: one or more control servers, one or more first conveying apparatuses, one or more second conveying apparatuses, at least one stereoscopic warehouse, at least one lifting apparatus, and one or more container handling apparatuses, the stereoscopic warehouse being provided with at least two floors, the floors of the stereoscopic warehouse being in communication with each other through the at least one lifting apparatus, and the control server communicating with the first conveying apparatus and the second conveying apparatus respectively, where at least some of bottom floor storage positions on a bottom floor of the stereoscopic warehouse are provided with movable carriers, and the movable carrier is configured to carry one or more containers;

each floor in other high floors other than the bottom floor of the stereoscopic warehouse is provided with at least one high floor connection point, the high floors are respectively provided with rails for operation of the first conveying apparatus, and at least some of high floor storage positions on the high floors are provided with movable carriers;

the control server is configured to determine, according to a conveying task, a first conveying apparatus, a second conveying apparatus and a lifting apparatus for executing the conveying task, send a conveying instruction for executing the conveying task to the first conveying apparatus, the second conveying apparatus, and the lifting apparatus respectively, determine a container handling apparatus for handling a container, and send an operation instruction for executing a goods take-out task or a goods storage task corresponding to the conveying task to the container handling apparatus;

the first conveying apparatus is configured to take out or place, according to the conveying instruction sent by the control server, a movable carrier indicated by the conveying instruction from or in a high floor storage position, and convey the movable carrier indicated by the conveying instruction between the high floor storage position and a high floor connection point;

the second conveying apparatus is configured to take out or place, according to the conveying instruction sent by the control server, the movable carrier indicated by the conveying instruction from or in a bottom floor storage position, and convey the movable carrier indicated by the conveying instruction between the lifting apparatus and the bottom floor storage position, between the lifting apparatus and the container handling apparatus, or between the bottom floor storage position and the container handling apparatus;

the lifting apparatus is configured to ascend or descend to a specified floor according to the conveying instruction sent by the control server, and at least convey one or a combination selected from the movable carrier indicated by the conveying instruction, the first conveying apparatus, and the second conveying apparatus between the floors; and the container handling apparatus is configured to take out, according to the operation instruction sent by the control server, a container from the movable carrier conveyed by the second conveying apparatus, or place a container in the movable carrier conveyed by the second conveying apparatus.

A2. The system according to claim A1, where the container handling apparatus includes a first sensor, the first sensor is configured to determine, when a container is to be taken out from the movable carrier, whether a corresponding container position in the movable carrier has the container, or determine, when a container in the movable carrier is to be placed, whether a corresponding container position in the movable carrier is empty.

A3. The system according to claim A1 or A2, where the container handling apparatus includes a second sensor, and the second sensor is configured to determine a pose deviation between the container handling apparatus and the corresponding container position in the movable carrier.

A4. The system according to claim A3, where the container handling apparatus is further configured to adjust, according to the pose deviation between the container handling apparatus and the corresponding container position that is determined by the second sensor, a pose of the container handling apparatus, to eliminate the pose deviation.

A5. The system according to claim A3, where the first sensor and the second sensor are the same sensor.

A6. The system according to claim A1 or A2, where the first sensor and the second sensor are image sensors.

A7. The system according to claim A1, where the control server is further configured to schedule at least one selected from the first conveying apparatus, the second conveying apparatus, and the lifting apparatus to return the movable carrier to an original storage position or another storage position of the stereoscopic warehouse.

A8. The system according to claim A7, where the control server is further configured to determine, according to at least one selected from a goods handling frequency and a goods access quantity of goods stored on the movable carrier, an activity level of the movable carrier, and determine, according to a rank of the activity level of the movable carrier, a storage position for the movable carrier when the movable carrier returns to the stereoscopic warehouse.

A9. The system according to claim A7, where the control server is further configured to determine, according to ranks of distances between the container handling apparatus and idle storage positions, a storage position for the movable carrier when the movable carrier returns to the stereoscopic warehouse.

A10. The system according to claim A1, where the control server is further configured to schedule, in response to a tallying task, at least one selected from the first conveying apparatus, the second conveying apparatus, and the lifting apparatus to adjust the movable carrier from an original storage position in the stereoscopic warehouse to another storage position in the stereoscopic warehouse or keep the movable carrier remaining at the original storage position.

A11. The system according to claim A10, where the control server is further configured to determine, according to at least one selected from a goods handling frequency and a goods access quantity of goods stored on the movable carrier, an activity level of the movable carrier, and determine, according to a rank of the activity level of the movable carrier, a storage position for the movable carrier after position adjustment during tallying.

A12. The system according to claim A1, where the container handling apparatus is located in a bottom floor workstation, the workstation further includes a transmission line and a picking station, an inlet and an outlet of the transmission line are respectively provided with the container handling apparatus, and the picking station is located in a transmission path of the transmission line;

the container handling apparatus located at the inlet of the transmission line is further configured to take out a container from a movable carrier located at the inlet, and place the container on the transmission line; and the container handling apparatus located at the outlet of the transmission line is further configured to obtain the container transported by the transmission line and place the container in a movable carrier located at the outlet.

A13. The system according to claim A1, where a height of a rail for storing the movable carriers is higher than a height of the first conveying apparatus not carrying the movable carrier; and the first conveying apparatus is further configured to travel to below the high floor storage position, and convey the movable carrier from below the high floor storage position in a piggyback manner and leave the high floor storage position.

A14. The system according to claim A1, where when the stereoscopic warehouse includes a plurality of lifting apparatuses, specified floors reachable by the plurality of lifting apparatuses are at least overlapped.

A15. The system according to claim A1, where a rail is provided in the lifting apparatus, and is used to be connected to the rail provided in the high floor, to allow the first conveying apparatus to travel into the lifting apparatus.

A16. The system according to claim A15, where the control server is further configured to determine, at least partially according to a conveying task to be executed for each high floor, a quantity of first conveying apparatuses required for each high floor, determine, according to the quantity of first conveying apparatuses required for each high floor and a current quantity of first conveying apparatuses on each high floor, first conveying apparatuses that need to be called for each high floor, and send a calling instruction to the first conveying apparatuses that need to be called; and the first conveying apparatus is further configured to travel into the lifting apparatus according to the received calling instruction, and reach a high floor specified by the calling instruction through the lifting apparatus.

A17. The system according to claim A15, where the high floor connection point is provided in the lifting apparatus; and the first conveying apparatus is further configured to travel to the high floor connection point in the lifting apparatus, and place the movable carrier at the high floor connection point or take out the movable carrier from the high floor connection point.

A18. The system according to claim A15, where at least some of floors in the high floors are further provided with the container handling apparatus, and the high floor connection points are respectively provided near the container handling apparatus on the high floor and in the lifting apparatus;

the first conveying apparatus is further configured to convey the movable carrier between the high floor storage position and the high floor connection point that is near the container handling apparatus, or convey a cargo carrier between the high floor connection point that is near the container handling apparatus and the high floor connection point in the lifting apparatus; and the container handling apparatus is further configured to take out a container from the movable carrier and place the container in the cargo carrier, or take out a container from the cargo carrier and place the container in the movable carrier.

A19. The system according to claim A1, where the movable carrier includes legs, and a height of an opening formed by the legs of the movable carrier is higher than a height of the second conveying apparatus not carrying the movable carrier; and the second conveying apparatus is further configured to: selectively travel, when not carrying the movable carrier, below at least some of movable carriers, or convey the movable carrier from below the at least some of movable carriers in a piggyback manner and leave the bottom floor storage position.

A20. The system according to claim A19, where an interval of columns between at least some of bottom floor storage positions on the bottom floor of the stereoscopic warehouse is greater than a width of the second conveying apparatus, and a height of a lowest point of a connection member between at least two adjacent columns on the bottom floor of the stereoscopic warehouse is higher than the height of the second conveying apparatus not carrying the movable carrier; and the second conveying apparatus is further configured to: selectively travel, when not carrying the movable carrier, between the at least two adjacent columns on the bottom floor.

A21. The system according to claim A1, where the second conveying apparatus is configured to enter the bottom floor storage position from an aisle position adjacent to the bottom floor storage position, and take out a movable carrier from the bottom floor storage position onto the second conveying apparatus, or place the movable carrier on the second conveying apparatus in the bottom floor storage position.

A22. The system according to claim A1, where the bottom floor of the stereoscopic warehouse is provided with at least one bottom floor connection point; and the second conveying apparatus is further configured to convey, according to the conveying instruction sent by the control server, the movable carrier indicated by the conveying instruction between the bottom floor storage position and the bottom floor connection point or between the lifting apparatus and the bottom floor connection point.

A23. The system according to claim A22, where a specified area on the bottom floor of the stereoscopic warehouse is provided with at least one bottom floor connection point; and the second conveying apparatus is configured to: take out the movable carrier from the bottom floor storage position or the lifting apparatus, convey the movable carrier to the bottom floor connection point, and place the movable carrier in the specified area; or take out the movable carrier from the bottom floor connection point in the specified area, and convey the movable carrier to the bottom floor storage position or the lifting apparatus.

A24. The system according to claim A1, where the system further includes: one or more external temporary storage areas, where the external temporary storage area is in at least one form selected from stereoscopic storage or planar storage;

the external temporary storage area and the at least one stereoscopic warehouse share at least some of the second conveying apparatuses, or the second conveying apparatus conveys and/or connects to the movable carrier between the external temporary storage area and the at least one stereoscopic warehouse; and the control server is further configured to store goods stock information of the external temporary storage area and the at least one stereoscopic warehouse.

A25. The system according to claim A1, where the container handling apparatus takes out a container from the movable carrier or places a container in the movable carrier in at least one manner selected from sucking, pushing, clamping, grabbing, hooking, holding, or lifting.

A26. The system according to claim A1, where the movable carrier is a movable rack, the movable rack includes at least one layer of partition, the at least one layer of partition divides the movable rack into at least two layers, at least one storage position is provided on the partition of the movable rack, and each storage position is capable of carrying at least one first container that is capable of accommodating warehouse goods.

A27. A scheduling method for stereoscopic warehouse conveying, where there exists at least one or more stereoscopic warehouses, the stereoscopic warehouse is provided with at least two floors, the floors of the stereoscopic warehouse are in communication with each other through at least one lifting apparatus, a bottom floor is provided with one or more container handling apparatuses, at least some of bottom floor storage positions on the bottom floor are provided with movable carriers, each floor in other high floors other than the bottom floor of the stereoscopic warehouse is provided with at least one high floor connection point, the high floors are respectively provided with rails for operation of a first conveying apparatus, at least some of high floor storage positions on the high floors are provided with movable carriers, and the method includes:

determining a conveying task to be executed;

determining, according to the conveying task, a first conveying apparatus, a second conveying apparatus and a lifting apparatus for executing the conveying task, and determining a container handling apparatus for handling a container; and sending a conveying instruction to the determined first conveying apparatus, the determined second conveying apparatus, and the determined lifting apparatus respectively, and sending an operation instruction to the container handling apparatus, where the conveying instruction is used for causing the first conveying apparatus, the second conveying apparatus, and the lifting apparatus to cooperate to convey a movable carrier from a high floor storage position or a bottom floor storage position of the stereoscopic warehouse to the container handling apparatus arranged on the bottom floor, or convey a movable carrier from the container handling apparatus arranged on the bottom floor to a high floor storage position or a bottom floor storage position of the stereoscopic warehouse; and the operation instruction is used for causing the container handling apparatus to take out a container from the movable carrier or place a container in the movable carrier.

What is claimed is:

1. A stereoscopic warehouse scheduling system, comprising one or more control servers, one or more first conveying apparatuses, one or more second conveying apparatuses, at least one stereoscopic warehouse, at least one lifting apparatus, and one or more container handling apparatuses, the stereoscopic warehouse being provided with at least two floors, the floors of the stereoscopic warehouse being in communication with each other through the at least one lifting apparatus, and the control server communicating with the first conveying apparatus and the second conveying apparatus respectively, wherein:

at least some of bottom floor storage positions on a bottom floor of the stereoscopic warehouse are provided with movable carriers, and the movable carrier is configured to carry one or more containers;

each floor in other high floors other than the bottom floor of the stereoscopic warehouse is provided with at least one high floor connection point, the high floors are respectively provided with rails for operation of the first conveying apparatus, and at least some of high floor storage positions on the high floors are provided with movable carriers;

the control server is configured to determine, according to a conveying task, a first conveying apparatus, a second conveying apparatus and a lifting apparatus for executing the conveying task, send a conveying instruction for executing the conveying task to the first conveying apparatus, the second conveying apparatus, and the lifting apparatus respectively, determine a container handling apparatus for handling a container, and send an operation instruction for executing a goods take-out task or a goods storage task corresponding to the conveying task to the container handling apparatus;

the first conveying apparatus is configured to take out or place, according to the conveying instruction sent by the control server, a movable carrier indicated by the conveying instruction from or in a high floor storage position, and convey the movable carrier indicated by the conveying instruction between the high floor storage position and a high floor connection point;

the second conveying apparatus is configured to take out or place, according to the conveying instruction sent by the control server, the movable carrier indicated by the conveying instruction from or in a bottom floor storage position, and convey the movable carrier indicated by the conveying instruction between the lifting apparatus and the bottom floor storage position, between the lifting apparatus and the container handling apparatus, or between the bottom floor storage position and the container handling apparatus;

the lifting apparatus is configured to ascend or descend to a specified floor according to the conveying instruction sent by the control server, and at least convey one or a combination selected from the movable carrier indicated by the conveying instruction, the first conveying apparatus, and the second conveying apparatus between the floors; and the container handling apparatus is configured to take out, according to the operation instruction sent by the control server, a container from the movable carrier conveyed by the second conveying apparatus, or place a container in the movable carrier conveyed by the second conveying apparatus.

2. The system according to claim 1, wherein:

the container handling apparatus comprises a first sensor, the first sensor is configured to determine, when a container is to be taken out from the movable carrier, whether a corresponding container position in the movable carrier has the container, or determine, when a container is to be placed in the movable carrier, whether a corresponding container position in the movable carrier is empty;

the container handling apparatus comprises a second sensor, and the second sensor is configured to determine a pose deviation between the container handling apparatus and the corresponding container position in the movable carrier; and the container handling apparatus is further configured to adjust, according to the pose deviation between the container handling apparatus and the corresponding container position that is determined by the second sensor, a pose of the container handling apparatus, to eliminate the pose deviation.

3. The system according to claim 1, wherein:

the control server is further configured to schedule, in response to a tallying task, at least one selected from the first conveying apparatus, the second conveying apparatus, and the lifting apparatus to adjust the movable carrier from an original storage position in the stereoscopic warehouse to another storage position in the stereoscopic warehouse or keep the movable carrier remaining at the original storage position; and the control server is further configured to determine, according to at least one selected from a goods handling frequency and a goods access quantity of goods stored on the movable carrier, an activity level of the movable carrier, and determine, according to a rank of the activity level of the movable carrier, a storage position for the movable carrier after position adjustment during tallying.

4. The system according to claim 1, wherein;

the container handling apparatus is located in a bottom floor workstation, the workstation further comprises a transmission line and a picking station, an inlet and an outlet of the transmission line are respectively provided with the container handling apparatus, and the picking station is located in a transmission path of the transmission line;

the container handling apparatus located at the inlet of the transmission line is further configured to take out a container from a movable carrier located at the inlet, and place the container on the transmission line; and the container handling apparatus located at the outlet of the transmission line is further configured to obtain the container transported by the transmission line and place the container in a movable carrier located at the outlet.

5. The system according to claim 1, wherein a height of a rail for storing the movable carriers is higher than a height of the first conveying apparatus not carrying the movable carrier; and the first conveying apparatus is further configured to travel to below the high floor storage position, and convey the movable carrier from below the high floor storage position in a piggyback manner and leave the high floor storage position.

6. The system according to claim 1, wherein an interval of columns between at least some of bottom floor storage positions on the bottom floor of the stereoscopic warehouse is greater than a width of the second conveying apparatus, and a height of a lowest point of a connection member between at least two adjacent columns on the bottom floor of the stereoscopic warehouse is higher than the height of the second conveying apparatus not carrying the movable carrier; and the second conveying apparatus is further configured to selectively travel, when not carrying the movable carrier, between the at least two adjacent columns on the bottom floor.

7. The system according to claim 1, wherein:

the system further comprises: one or more external temporary storage areas, wherein the external temporary storage area is in at least one form selected from stereoscopic storage or planar storage;

the external temporary storage area and the at least one stereoscopic warehouse share at least some of the second conveying apparatuses, or the second conveying apparatus conveys and/or connects to the movable carrier between the external temporary storage area and the at least one stereoscopic warehouse; and the control server is further configured to store goods stock information of the external temporary storage area and the at least one stereoscopic warehouse.

8. The system according to claim 1, wherein the container handling apparatus takes out a container from the movable carrier or places a container in the movable carrier in at least one manner selected from sucking, pushing, clamping, grabbing, hooking, holding, or lifting.

9. The system according to claim 1, wherein:

the second conveying apparatus is configured to enter the bottom floor storage position from an aisle position adjacent to the bottom floor storage position, and take out a movable carrier from the bottom floor storage position onto the second conveying apparatus, or place the movable carrier on the second conveying apparatus in the bottom floor storage position; or the bottom floor of the stereoscopic warehouse is provided with at least one bottom floor connection point; and the second conveying apparatus is further configured to convey, according to the conveying instruction sent by the control server, the movable carrier indicated by the conveying instruction between the bottom floor storage position and the bottom floor connection point or between the lifting apparatus and the bottom floor connection point.

10. The system according to claim 9, wherein a specified area on the bottom floor of the stereoscopic warehouse is provided with at least one bottom floor connection point; and the second conveying apparatus is configured to: take out the movable carrier from the bottom floor storage position or the lifting apparatus, convey the movable carrier to the bottom floor connection point, and place the movable carrier in the specified area; or take out the movable carrier from the bottom floor connection point in the specified area, and convey the movable carrier to the bottom floor storage position or the lifting apparatus.

11. The system according to claim 1, wherein the control server is further configured to schedule at least one selected from the first conveying apparatus, the second conveying apparatus, and the lifting apparatus to return the movable carrier to an original storage position or another storage position of the stereoscopic warehouse.

12. The system according to claim 11, wherein the control server is further configured to determine, according to at least one selected from a goods handling frequency and a goods access quantity of goods stored on the movable carrier, an activity level of the movable carrier, and determine, according to a rank of the activity level of the movable carrier, a storage position for the movable carrier when the movable carrier returns to the stereoscopic warehouse.

13. The system according to claim 11, wherein the control server is further configured to determine, according to ranks of distances between the container handling apparatus and idle storage positions, a storage position for the movable carrier when the movable carrier returns to the stereoscopic warehouse.

14. The system according to claim 1, wherein a rail is provided in the lifting apparatus, and is used to be connected to the rail provided in the high floor to allow the first conveying apparatus to travel into the lifting apparatus.

15. The system according to claim 14, wherein the high floor connection point is provided in the lifting apparatus; and the first conveying apparatus is further configured to travel to the high floor connection point in the lifting apparatus, and place the movable carrier at the high floor connection point or take out the movable carrier from the high floor connection point.

16. The system according to claim 14, wherein at least some of floors in the high floors are further provided with the container handling apparatus, and the high floor connection points are respectively provided near the container handling apparatus on the high floor and in the lifting apparatus;

the first conveying apparatus is further configured to convey the movable carrier between the high floor storage position and the high floor connection point that is near the container handling apparatus, or convey a cargo carrier between the high floor connection point that is near the container handling apparatus and the high floor connection point in the lifting apparatus; and the container handling apparatus is further configured to take out a container from the movable carrier and place the container in the cargo carrier, or take out a container from the cargo carrier and place the container in the movable carrier.

17. The system according to claim 1, wherein the container handling apparatus comprises a shelf body, the shelf body is provided with a container access assembly and a carrying assembly, and the container access assembly is configured to move on the shelf body; the shelf body comprises an X-axis rail and a Y-axis rail that are perpendicular to each other; the Y-axis rail is configured to move along the X-axis rail, and the container access assembly is configured to move along the Y-axis rail; and the container access assembly is capable of taking out a container from a carrier in a Z-axis direction and loading the container onto the carrying assembly, or unloading a container from the carrying assembly and placing the container in a carrier.

18. The system according to claim 17, wherein:

the shelf body comprises a portal frame assembly, and the X-axis rail comprises a ground rail structure and an overhead rail structure that is arranged on the portal frame assembly; and two ends of the Y-axis rail are respectively matched with the ground rail structure and the overhead rail structure in a guiding manner.

19. The system according to claim 17, wherein at least two Y-axis rails are provided, and at least one container access assembly is arranged on each Y-axis rail.

20. The system according to claim 17, wherein the container access assembly takes out a container from the carrier or places a container in the carrier in at least one manner selected from sucking, pushing, clamping, grabbing, hooking, holding, or lifting.

* * * * *